United States Patent
Gao et al.

(10) Patent No.: US 11,316,632 B2
(45) Date of Patent: Apr. 26, 2022

(54) SRS TRANSMISSION METHOD AND DEVICE

(71) Applicant: China Academy of Telecommunications Technology, Beijing (CN)

(72) Inventors: Xuejuan Gao, Beijing (CN); Yanping Xing, Beijing (CN); Xueming Pan, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 15/774,270

(22) PCT Filed: Jan. 6, 2017

(86) PCT No.: PCT/CN2017/070366
§ 371 (c)(1),
(2) Date: May 7, 2018

(87) PCT Pub. No.: WO2017/076372
PCT Pub. Date: May 11, 2017

(65) Prior Publication Data
US 2018/0331800 A1  Nov. 15, 2018

(30) Foreign Application Priority Data

Nov. 6, 2015  (CN) .......................... 201510752428.6

(51) Int. Cl.
*H04L 5/00* (2006.01)
*H04L 5/14* (2006.01)
(Continued)

(52) U.S. Cl.
CPC .......... *H04L 5/0048* (2013.01); *H04L 5/0012* (2013.01); *H04L 5/0051* (2013.01);
(Continued)

(58) Field of Classification Search
CPC ... H04L 5/0012; H04L 5/0048; H04L 5/0051; H04L 5/0094; H04L 5/1469; H04L 5/005;
(Continued)

(56) References Cited

U.S. PATENT DOCUMENTS 9,407,419 B2 * 8/2016 Yang ..................... H04L 5/0007
9,781,735 B2 * 10/2017 Comsa .............. H04W 72/1215
(Continued)

FOREIGN PATENT DOCUMENTS

CN   103167594 A   6/2013
CN   103220070 A   7/2013
(Continued)

OTHER PUBLICATIONS

Dinan et al. U.S. Appl. No. 62/143,181.*
(Continued)

*Primary Examiner* — Thomas R Cairns
(74) *Attorney, Agent, or Firm* — Kilpatrick Townsend & Stockton, LLP

(57) ABSTRACT

Disclosed are an SRS transmission method and device. A terminal determines whether to transmit an SRS according to whether an SRS transmission frequency domain resource overlaps with a narrowband used for transmitting data or according to whether an adjacent narrowband used for data transmission is the same. The present invention is particularly suitable for narrowband terminal SRS transmission.

10 Claims, 1 Drawing Sheet

Decide whether to transmit an SRS, according to whether transmission frequency resources of an SRS overlap with a narrowband for transmitting data, or whether adjacent narrowbands for transmitting data are the same — 101

If it is decided to transmit an SRS, then transmit an SRS over the transmission frequency resources of an SRS; otherwise, drop an SRS to be transmitted — 102

(51) Int. Cl.
  *H04W 72/04*   (2009.01)
  *H04W 74/08*   (2009.01)
  *H04W 4/70*   (2018.01)
(52) U.S. Cl.
  CPC .......... *H04L 5/0094* (2013.01); *H04L 5/1469* (2013.01); *H04W 72/0406* (2013.01); *H04W 74/0833* (2013.01); *H04W 4/70* (2018.02)
(58) Field of Classification Search
  CPC .... H04L 5/1476–1492; H04L 27/2611; H04W 72/0406; H04W 74/0833; H04W 74/70; H04W 4/70; H04W 8/20; H04W 28/16; H04W 36/0072; H04W 72/0413–0433; H04W 74/0841–0858
  See application file for complete search history.

(56) References Cited

U.S. PATENT DOCUMENTS

| | | | | |
|---|---|---|---|---|
| 10,064,102 | B2* | 8/2018 | Kakishima | H04W 52/32 |
| 10,110,362 | B2* | 10/2018 | Dinan | H04L 1/1812 |
| 10,425,924 | B2* | 9/2019 | Takeda | H04W 74/0808 |
| 2017/0141901 | A1* | 5/2017 | Rico Alvarino | H04W 4/70 |

FOREIGN PATENT DOCUMENTS

| | | |
|---|---|---|
| CN | 104380820 A | 2/2015 |
| CN | 104854805 A | 8/2015 |

OTHER PUBLICATIONS

LG Electronics: "Discussion on data overlapping and simultaneous transmission and reception for MTC UEs", 3GPP Draft; R1-154244 Overlap Issue, 3rd Generation Partnership Project (3GPP), Beijing, China, on Aug. 23, 2015, 6 pages.

LG Electronics: "Details on SR repetition and SRS transmission for MTC UE", 3GPP Draft; R1-155371 SR and SRS, 3rd Generation Partnership Project (3GPP), Malmö, Sweden, Oct. 4, 2015, 5 pages.

Qualcomm Inc., "Corrections SRS dropping in CA in 36.213" 3GPP TSG-RAN WG1 Meeting 1184bis, R1-163434, Apr. 15, 2016, 9 pages.

Ericsson Rapporteur. "Email Discussion Report on CSI/SRS reporting at DRX state change", 3GPP TSG-RAN WG2 1180, Tdoc R2-125628, Nov. 16, 2012, 20 pages.

NT DoCoMo, "Remaining Issues Regarding Multiple TA", 3GPP TSG RAN WG1 Meeting #71, RI-124836, Nov. 16, 2012 (Nov. 16, 2012), the whole document, 4 pages.

International Search Report dated Mar. 30, 2017 in the corresponding international application(application No. PCT/CN2017/070366).

Keysight Technologies, Inc. "LTE Physical Layer Overview", total 11 pages.

* cited by examiner

SRS TRANSMISSION METHOD AND DEVICE

This application is a National Stage of International Application No. PCT/CN2017/070366, filed Jan. 06, 2017, which claims the benefit of Chinese Patent Application No. 201510752428.6, filed with the Chinese Patent Office on Nov. 06, 2015, and entitled "A method and apparatus for transmitting an SRS", which are hereby incorporated by reference in their entireties.

FIELD

The present invention relates to the field of communications, and particularly to a method and apparatus for transmitting an SRS.

BACKGROUND

As the internet of things is emerging, a support of Machine Type Communication (MTC) in a Long Term Evolution (LTE) system has been increasingly valued. An MTC device (or an MTC terminal) may have a part of Machine to Machine (M2M) communication characteristics. e.g., low mobility, a small amount of data to be transmitted, insensitivity to a communication delay, extremely low power consumption as required, etc., where in order to lower the cost of the MTC terminal, a type of terminal supporting a radio frequency bandwidth of only 1.4 MHz in both the uplink and the downlink has been newly defined.

Since the MTC terminal can only operate in a limited bandwidth, several narrowbands may be defined for the MTC terminal in a system band, where there are a limited number of Physical Resource Blocks (PRBs) in each narrowband. Particularly there are six PRBs in each narrowband. There is uplink transmission and downlink transmission by the MTC terminal in only one of the narrowbands. When the transmitting terminal is to jump from one narrowband to another narrowband, some retuning period of time is required for a radio frequency element, etc., of the terminal to be retuned from the narrowband to the other.

A Sounding Reference Symbol (SRS) is transmitted in the last SC-FDMA symbol in an SRS sub-frame preconfigured in higher-layer signaling. For a TDD system, an SRS can be transmitted in one or two UpPTS symbols in a special sub-frame. A transmission bandwidth of an SRS in the frequency domain is preconfigured in the higher-layer signaling as an integer multiply of four PRBs. An SRS may or may not be transmitted in a system SRS bandwidth in a frequency hop mode as configured in the higher-layer signaling. When transmission of an SRS in the frequency hop mode is enabled, an SRS may be transmitted at a different frequency position selected in a different SRS sub-frame in a fixed frequency hop pattern.

An SRS can be transmitted in the same sub-frame as a Physical Uplink Control Channel (PUCCH)/Physical Uplink Shared Channel (PUSCH), where the last symbols of the PUCCH and the PUSCH are spared for transmitting an SRS instead of data. In a low-complexity MTC system, a frequency position where an SRS is transmitted, and a narrowband in which a PUCCH/PUSCH is transmitted can be determined separately, and when an SRS can be transmitted in a frequency hop mode, the SRS is also transmitted at a different frequency position in a different SRS sub-frame, so the frequency position where the SRS is transmitted may not overlap with the narrowband in which the PUCCH/PUSCH adjacent thereto is transmitted in the frequency domain; and there are so limited transmit and receive bandwidths of low-complexity MTC that signals cannot be transmitted and received at different narrowband positions at the same instance of time, and a retuning period of time is required between the different narrowbands to retune a radio frequency element to the different frequency positions, so the SRS transmission rule in the prior art may not be applicable to the low-complexity MTC system any longer.

SUMMARY

In view of this, embodiments of the invention provide a method and apparatus for transmitting an SRS.

An embodiment of the invention provides a method for transmitting an SRS, the method includes: deciding whether to transmit an SRS, according to whether transmission frequency resources of an SRS overlap with a narrowband for transmitting data, or according to whether adjacent narrowbands for transmitting data are same.

Optionally deciding whether to transmit an SRS, according to whether transmission frequency resources of an SRS overlap with a narrowband for transmitting data includes: in an SRS sub-frame, if transmission frequency resources of an SRS do not overlap with a narrowband for transmitting uplink data, then deciding not to transmit an SRS in the SRS sub-frame; or in an SRS sub-frame, if transmission frequency resources of an SRS do not overlap with a narrowband for transmitting uplink data, and there are uplink data transmitted in the SRS sub-frame, then deciding not to transmit an SRS in the SRS sub-frame; or in an SRS sub-frame, if transmission frequency resources of an SRS partially overlap with a narrowband for transmitting uplink data, then deciding not to transmit an SRS in the SRS sub-frame; or in an SRS sub-frame, if transmission frequency resources of an SRS partially overlap with a narrowband for transmitting uplink data, then deciding not to transmit an SRS over frequency resources, which do not overlap with the narrowband for transmitting uplink data, among the transmission frequency resources of an SRS; or in an SRS sub-frame, if transmission frequency resources of an SRS partially overlap with a narrowband for transmitting an uplink channel, and there are uplink data transmitted in the SRS sub-frame, then deciding not to transmit an SRS in the SRS sub-frame; or in an SRS sub-frame, if transmission frequency resources of an SRS partially overlap with a narrowband for transmitting an uplink channel, and there are uplink data transmitted in the SRS sub-frame, then deciding not to transmit an SRS over frequency resources, which do not overlap with the narrowband for transmitting uplink data, among the transmission frequency resources of an SRS.

Optionally deciding whether to transmit an SRS, according to whether transmission frequency resources of an SRS overlap with a narrowband for transmitting data includes: in an SRS sub-frame, if transmission frequency resources of an SRS do not overlap with a narrowband for transmitting uplink data in an adjacent uplink sub-frame subsequent to the SRS sub-frame, then deciding not to transmit an SRS in the SRS sub-frame; or in an SRS sub-frame, if transmission frequency resources of an SRS do not overlap with a narrowband for transmitting uplink data in an adjacent uplink sub-frame subsequent to the SRS sub-frame, and there are uplink data transmitted in the adjacent uplink sub-frame subsequent to the SRS sub-frame, then deciding not to transmit an SRS in the SRS sub-frame; or in an SRS sub-frame, if transmission frequency resources of an SRS partially overlap with a narrowband for transmitting uplink data in an adjacent uplink sub-frame subsequent to the SRS sub-frame, then deciding not to transmit an SRS in the SRS sub-frame; or in an SRS sub-frame, if transmission frequency resources of an SRS partially overlap with a narrowband for transmitting uplink data in an adjacent uplink sub-frame subsequent to the SRS sub-frame, then deciding not to transmit an SRS over frequency resources, which do not overlap with the narrowband for transmitting uplink data, among the transmission frequency resources of an SRS; or in an SRS sub-frame, if transmission frequency resources of an SRS partially overlap with a narrowband for transmitting an uplink channel in an adjacent uplink sub-frame subsequent to the SRS sub-frame, and there are uplink data transmitted in the adjacent uplink sub-frame subsequent to the SRS sub-frame, then deciding not to transmit an SRS in the SRS sub-frame; or in an SRS sub-frame, if transmission frequency resources of an SRS partially overlap with a narrowband for transmitting an uplink channel in an adjacent uplink sub-frame subsequent to the SRS sub-frame, and there are uplink data transmitted in the adjacent uplink sub-frame subsequent to the SRS sub-frame, then deciding not to transmit an SRS over frequency resources, which do not overlap with the narrowband for transmitting uplink data, among the transmission frequency resources of an SRS.

Optionally if an uplink channel transmitted in the adjacent uplink sub-frame subsequent to the SRS sub-frame is a Physical Random Access Channel (PRACH), then deciding whether to transmit an SRS, according to whether transmission frequency resources of an SRS overlap with a narrowband for transmitting data will include: in the SRS sub-frame, if the transmission frequency resources of an SRS do not overlap with the narrowband for transmitting a PRACH in the adjacent uplink sub-frame subsequent to the SRS sub-frame, and a Timing Advance (TA) value corresponding to the SRS sub-frame is less than a retuning period of time, then deciding not to transmit an SRS in the SRS sub-frame; or in the SRS sub-frame, if the transmission frequency resources of an SRS partially overlap with the narrowband for transmitting a PRACH in the adjacent uplink sub-frame subsequent to the SRS sub-frame, and a TA value corresponding to the SRS sub-frame is less than a retuning period of time, then deciding not to transmit an SRS in the SRS sub-frame; or in the SRS sub-frame, if the transmission frequency resources of an SRS partially overlap with the narrowband for transmitting a PRACH in the adjacent uplink sub-frame subsequent to the SRS sub-frame, and a TA value corresponding to the SRS sub-frame is less than a retuning period of time, then deciding not to transmit an SRS over frequency resources, which do not overlap with the narrowband for transmitting uplink data, among the transmission frequency resources of an SRS.

Optionally deciding whether to transmit an SRS, according to whether adjacent narrowbands for transmitting data are the same includes: if a narrowband for transmitting uplink data in the SRS sub-frame is different from a narrowband for transmitting uplink data in an adjacent uplink sub-frame subsequent to the SRS sub-frame, then deciding not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in both of the narrowband for transmitting uplink data in the SRS sub-frame and the narrowband for transmitting uplink data in the adjacent uplink sub-frame subsequent to the SRS sub-frame, then deciding not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which does not overlap with transmission frequency resources of an SRS, among the narrowband for transmitting uplink data in the SRS sub-frame and the narrowband for transmitting uplink data in the adjacent uplink sub-frame subsequent to the SRS sub-frame, then deciding not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which partially overlaps with transmission frequency resources of an SRS, among the narrowband for transmitting uplink data in the SRS sub-frame, and the narrowband for transmitting uplink data in the adjacent uplink sub-frame subsequent to the SRS sub-frame, then deciding not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which partially overlaps with transmission frequency resources of an SRS, among the narrowband for transmitting uplink data in the SRS sub-frame and the narrowband for transmitting uplink data in the adjacent uplink sub-frame subsequent to the SRS sub-frame, then deciding not to transmit an SRS over frequency resources, which do not overlap with the narrowband in which there are uplink data transmitted, among the transmission frequency resources of an SRS.

Optionally deciding whether to transmit an SRS, according to whether transmission frequency resources of an SRS overlap with a narrowband for transmitting data includes: in a special sub-frame of a Time Division Duplex (TDD) system, if transmission frequency resources of an SRS in an Uplink Pilot Time Slot (UpPTS) do not overlap with a narrowband for transmitting downlink data in a Downlink Pilot Time Slot (DwPTS), then deciding not to transmit an SRS in the UpPTS of the special sub-frame; or in a special sub-frame of a TDD system, if transmission frequency resources of an SRS in an UpPTS do not overlap with a narrowband for transmitting downlink data in a DwPTS, and there are downlink data transmitted in the DwPTS, then deciding not to transmit an SRS in the UpPTS of the special sub-frame; or in a special sub-frame of a TDD system, if transmission frequency resources of an SRS in an UpPTS partially overlap with a narrowband for transmitting downlink data in a DwPTS, then deciding not to transmit an SRS in the UpPTS of the special sub-frame; or in a special sub-frame of a TDD system, if transmission frequency resources of an SRS in an UpPTS partially overlap with a narrowband for transmitting downlink data in a DwPTS, and there are downlink data transmitted in the DwPTS, then deciding not to transmit an SRS in the UpPTS of the special sub-frame; or in a special sub-frame of a TDD system, if transmission frequency resources of an SRS in an UpPTS partially overlap with a narrowband for transmitting downlink data in a DwPTS, then deciding not to transmit an SRS over frequency resources, which do not overlap with the narrowband for transmitting downlink data in the DwPTS, among the transmission frequency resources of an SRS; or in a special sub-frame of a TDD system, if transmission frequency resources of an SRS in an UpPTS partially overlap with a narrowband for transmitting downlink data in a DwPTS, and there are downlink data transmitted in the DwPTS, then deciding not to transmit an SRS over frequency resources, which do not overlap with the narrowband for transmitting downlink data in the DwPTS, among the transmission frequency resources of an SRS.

Optionally deciding whether to transmit an SRS, according to whether adjacent narrowbands for transmitting data are the same includes: if a narrowband for transmitting downlink data in a DwPTS of a special sub-frame of a TDD system is different from a narrowband for transmitting uplink data in an adjacent uplink sub-frame subsequent to the special sub-frame, then deciding not to transmit an SRS in an UpPTS of the special sub-frame; or if a narrowband for transmitting downlink data in a DwPTS of a special sub-frame of a TDD system is different from a narrowband for transmitting uplink data in an adjacent uplink sub-frame subsequent to the special sub-frame, and there are data transmitted in both of the DwPTS of the special sub-frame and the adjacent uplink sub-frame subsequent to the special sub-frame, then deciding not to transmit an SRS in an UpPTS of the special sub-frame.

Optionally the uplink data include data transmitted in one or more of following uplink channels: a PUCCH, a PUSCH, and a PRACH.

Optionally the downlink data include data transmitted in one or more of following downlink channels: a PDSCH an M-PDCCH, a PBCH, and a PMCH.

Optionally the SRS sub-frame is a sub-frame specific to a narrowband terminal, and the SRS sub-frame includes an UpPTS or a normal uplink sub-frame.

An embodiment of the invention provides an apparatus for transmitting an SRS, the apparatus includes: a determining unit configured to decide whether to transmit an SRS, according to whether transmission frequency resources of an SRS overlap with a narrowband for transmitting data, or whether adjacent narrowbands for transmitting data are the same.

Optionally the determining unit is configured: in an SRS sub-frame, if transmission frequency resources of an SRS do not overlap with a narrowband for transmitting uplink data, to decide not to transmit an SRS in the SRS sub-frame; or in an SRS sub-frame, if transmission frequency resources of an SRS do not overlap with a narrowband for transmitting uplink data, and there are uplink data transmitted in the SRS sub-frame, to decide not to transmit an SRS in the SRS sub-frame; or in an SRS sub-frame, if transmission frequency resources of an SRS partially overlap with a narrowband for transmitting uplink data, to decide not to transmit an SRS in the SRS sub-frame; or in an SRS sub-frame, if transmission frequency resources of an SRS partially overlap with a narrowband for transmitting uplink data, to decide not to transmit an SRS over frequency resources, which do not overlap with the narrowband for transmitting uplink data, among the transmission frequency resources of an SRS; or in an SRS sub-frame, if transmission frequency resources of an SRS partially overlap with a narrowband for transmitting an uplink channel, and there are uplink data transmitted in the SRS sub-frame, to decide not to transmit an SRS in the SRS sub-frame, or in an SRS sub-frame, if transmission frequency resources of an SRS partially overlap with a narrowband for transmitting an uplink channel, and there are uplink data transmitted in the SRS sub-frame, to decide not to transmit an SRS over frequency resources, which do not overlap with the narrowband for transmitting uplink data, among the transmission frequency resources of an SRS.

Optionally the determining unit is configured: in an SRS sub-frame, if transmission frequency resources of an SRS do not overlap with a narrowband for transmitting uplink data in an adjacent uplink sub-frame subsequent to the SRS sub-frame, to decide not to transmit an SRS in the SRS sub-frame; or in an SRS sub-frame, if transmission frequency resources of an SRS do not overlap with a narrowband for transmitting uplink data in an adjacent uplink sub-frame subsequent to the SRS sub-frame, and there are uplink data transmitted in the adjacent uplink sub-frame subsequent to the SRS sub-frame, to decide not to transmit an SRS in the SRS sub-frame; or in an SRS sub-frame, if transmission frequency resources of an SRS partially overlap with a narrowband for transmitting uplink data in an adjacent uplink sub-frame subsequent to the SRS sub-frame, to decide not to transmit an SRS in the SRS sub-frame; or in an SRS sub-frame, if transmission frequency resources of an SRS partially overlap with a narrowband for transmitting uplink data in an adjacent uplink sub-frame subsequent to the SRS sub-frame, to decide not to transmit an SRS over frequency resources, which do not overlap with the narrowband for transmitting uplink data, among the transmission frequency resources of an SRS; or in an SRS sub-frame, if transmission frequency resources of an SRS partially overlap with a narrowband for transmitting an uplink channel in an adjacent uplink sub-frame subsequent to the SRS sub-frame, and there are uplink data transmitted in the adjacent uplink sub-frame subsequent to the SRS sub-frame, to decide not to transmit an SRS in the SRS sub-frame; or in an SRS sub-frame, if transmission frequency resources of an SRS partially overlap with a narrowband for transmitting an uplink channel in an adjacent uplink sub-frame subsequent to the SRS sub-frame, and there are uplink data transmitted in the adjacent uplink sub-frame subsequent to the SRS sub-frame, to decide not to transmit an SRS over frequency resources, which do not overlap with the narrowband for transmitting uplink data, among the transmission frequency resources of an SRS.

Optionally the determining unit is configured: if an uplink channel transmitted in the adjacent uplink sub-frame subsequent to the SRS sub-frame is a Physical Random Access Channel (PRACH), then: in the SRS sub-frame, if the transmission frequency resources of an SRS do not overlap with the narrowband for transmitting a PRACH in the adjacent uplink sub-frame subsequent to the SRS sub-frame, and a Timing Advance (TA) value corresponding to the SRS sub-frame is less than a retuning period of time, to decide not to transmit an SRS in the SRS sub-frame; or in the SRS sub-frame, if the transmission frequency resources of an SRS partially overlap with the narrowband for transmitting a PRACH in the adjacent uplink sub-frame subsequent to the SRS sub-frame, and a TA value corresponding to the SRS sub-frame is less than a retuning period of time, to decide not to transmit an SRS in the SRS sub-frame; or in the SRS sub-frame, if the transmission frequency resources of an SRS partially overlap with the narrowband for transmitting a PRACH in the adjacent uplink sub-frame subsequent to the SRS sub-frame, and a TA value corresponding to the SRS sub-frame is less than a retuning period of time, to decide not to transmit an SRS over frequency resources, which do not overlap with the narrowband for transmitting uplink data, among the transmission frequency resources of an SRS.

Optionally the determining unit is configured: if a narrowband for transmitting uplink data in the SRS sub-frame is different from a narrowband for transmitting uplink data in an adjacent uplink sub-frame subsequent to the SRS sub-frame, to decide not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in both of the narrowband for transmitting uplink data in the SRS sub-frame and the narrowband for transmitting uplink data in the adjacent uplink sub-frame subsequent to the SRS sub-frame, to decide not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which does not overlap with transmission frequency resources of an SRS, among the narrowband for transmitting uplink data in the SRS sub-frame, and the narrowband for transmitting uplink data in the adjacent uplink sub-frame subsequent to the SRS sub-frame, to decide not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which partially overlaps with transmission frequency resources of an SRS, among the narrowband for transmitting uplink data in the SRS sub-frame and the narrowband for transmitting uplink data in the adjacent uplink sub-frame subsequent to the SRS sub-frame, to decide not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which partially overlaps with transmission frequency resources of an SRS, among the narrowband for transmitting uplink data in the SRS sub-frame and the narrowband for transmitting uplink data in the adjacent uplink sub-frame subsequent to the SRS sub-frame, to decide not to transmit an SRS over frequency resources, which do not overlap with the narrowband in which there are uplink data transmitted, among the transmission frequency resources of an SRS.

Optionally the determining unit is configured: in a special sub-frame of a Time Division Duplex (TDD) system, if transmission frequency resources of an SRS in an Uplink Pilot Time Slot (UpPTS) do not overlap with a narrowband for transmitting downlink data in a Downlink Pilot Time Slot (DwPTS), to decide not to transmit an SRS in the UpPTS of the special sub-frame; or in a special sub-frame of a TDD system, if transmission frequency resources of an SRS in an UpPTS do not overlap with a narrowband for transmitting downlink data in a DwPTS, and there are downlink data transmitted in the DwPTS, to decide not to transmit an SRS in the UpPTS of the special sub-frame; or in a special sub-frame of a TDD system, if transmission frequency resources of an SRS in an UpPTS partially overlap with a narrowband for transmitting downlink data in a DwPTS, to decide not to transmit an SRS in the UpPTS of the special sub-frame; or in a special sub-frame of a TDD system, if transmission frequency resources of an SRS in an UpPTS partially overlap with a narrowband for transmitting downlink data in a DwPTS, and there are downlink data transmitted in the DwPTS, to decide not to transmit an SRS in the UpPTS of the special sub-frame; or in a special sub-frame of a TDD system, if transmission frequency resources of an SRS in an UpPTS partially overlap with a narrowband for transmitting downlink data in a DwPTS, to decide not to transmit an SRS over frequency resources, which do not overlap with the narrowband for transmitting downlink data in the DwPTS, among the transmission frequency resources of an SRS; or in a special sub-frame of a TDD system, if transmission frequency resources of an SRS in an UpPTS partially overlap with a narrowband for transmitting downlink data in a DwPTS, and there are downlink data transmitted in the DwPTS, to decide not to transmit an SRS over frequency resources, which do not overlap with the narrowband for transmitting downlink data in the DwPTS, among the transmission frequency resources of an SRS.

Optionally the determining unit is configured: if a narrowband for transmitting downlink data in a DwPTS of a special sub-frame of a TDD system is different from a narrowband for transmitting uplink data in an adjacent uplink sub-frame subsequent to the special sub-frame, to decide not to transmit an SRS in an UpPTS of the special sub-frame; or if a narrowband for transmitting downlink data in a DwPTS of a special sub-frame of a TDD system is different from a narrowband for transmitting uplink data in an adjacent uplink sub-frame subsequent to the special sub-frame, and there are data transmitted in both of the DwPTS of the special sub-frame and the adjacent uplink sub-frame subsequent to the special sub-frame, to decide not to transmit an SRS in an UpPTS of the special sub-frame.

Optionally the uplink data include data transmitted in one or more of following uplink channels: a PUCCH, a PUSCH, and a PRACH.

Optionally the downlink data include data transmitted in one or more of following downlink channels: a PDSCH, an M-PDCCH, a PBCH and a PMCH.

Optionally the SRS sub-frame is a sub-frame specific to a narrowband terminal, and the SRS sub-frame includes an UpPTS or a normal uplink sub-frame.

An embodiment of the invention provides an apparatus for transmitting an SRS, the apparatus including a processor, a memory, and a transceiver; the processor is configured to read and execute program in the memory: to transmit an SRS, according to whether transmission frequency resources of an SRS overlap with a narrowband for transmitting data, or whether adjacent narrowbands for transmitting data are same; and the transceiver is configured to be controlled by the processor to transmit and receive data.

Optionally the processor is configured: in an SRS sub-frame, if transmission frequency resources of an SRS do not overlap with a narrowband for transmitting uplink data, to decide not to transmit an SRS in the SRS sub-frame; or in an SRS sub-frame, if transmission frequency resources of an SRS do not overlap with a narrowband for transmitting uplink data, and there are uplink data transmitted in the SRS sub-frame, to decide not to transmit an SRS in the SRS sub-frame; or in an SRS sub-frame, if transmission frequency resources of an SRS partially overlap with a narrowband for transmitting uplink data, to decide not to transmit an SRS in the SRS sub-frame; or in an SRS sub-frame, if transmission frequency resources of an SRS partially overlap with a narrowband for transmitting uplink data, to decide not to transmit an SRS over frequency resources, which do not overlap with the narrowband for transmitting uplink data, among the transmission frequency resources of an SRS; or in an SRS sub-frame, if transmission frequency resources of an SRS partially overlap with a narrowband for transmitting an uplink channel, and there are uplink data transmitted in the SRS sub-frame, to decide not to transmit an SRS in the SRS sub-frame; or in an SRS sub-frame, if transmission frequency resources of an SRS partially overlap with a narrowband for transmitting an uplink channel, and there are uplink data transmitted in the SRS sub-frame, to decide not to transmit an SRS over frequency resources, which do not overlap with the narrowband for transmitting uplink data, among the transmission frequency resources of an SRS.

Optionally the processor is configured: in an SRS sub-frame, if transmission frequency resources of an SRS do not overlap with a narrowband for transmitting uplink data in an adjacent uplink sub-frame subsequent to the SRS sub-frame, to decide not to transmit an SRS in the SRS sub-frame; or in an SRS sub-frame, if transmission frequency resources of an SRS do not overlap with a narrowband for transmitting uplink data in an adjacent uplink sub-frame subsequent to the SRS sub-frame, and there are uplink data transmitted in the adjacent uplink sub-frame subsequent to the SRS sub-frame, to decide not to transmit an SRS in the SRS sub-frame; or in an SRS sub-frame, if transmission frequency resources of an SRS partially overlap with a narrowband for transmitting uplink data in an adjacent uplink sub-frame subsequent to the SRS sub-frame, to decide not to transmit an SRS in the SRS sub-frame; or in an SRS sub-frame, if transmission frequency resources of an SRS partially overlap with a narrowband for transmitting uplink data in an adjacent uplink sub-frame subsequent to the SRS sub-frame, to decide not to transmit an SRS over frequency resources, which do not overlap with the narrowband for transmitting uplink data, among the transmission frequency resources of an SRS; or in an SRS sub-frame, if transmission frequency resources of an SRS partially overlap with a narrowband for transmitting an uplink channel in an adjacent uplink sub-frame subsequent to the SRS sub-frame, and there are uplink data transmitted in the adjacent uplink sub-frame subsequent to the SRS sub-frame, to decide not to transmit an SRS in the SRS sub-frame; or in an SRS sub-frame, if transmission frequency resources of an SRS partially overlap with a narrowband for transmitting an uplink channel in an adjacent uplink sub-frame subsequent to the SRS sub-frame, and there are uplink data transmitted in the adjacent uplink sub-frame subsequent to the SRS sub-frame, to decide not to transmit an SRS over frequency resources, which do not overlap with the narrowband for transmitting uplink data, among the transmission frequency resources of an SRS.

Optionally the processor is configured: if an uplink channel transmitted in the adjacent uplink sub-frame subsequent to the SRS sub-frame is a Physical Random Access Channel (PRACH), then: in the SRS sub-frame, if the transmission frequency resources of an SRS do not overlap with the narrowband for transmitting a PRACH in the adjacent uplink sub-frame subsequent to the SRS sub-frame, and a Timing Advance (TA) value corresponding to the SRS sub-frame is less than a retuning period of time, to decide not to transmit an SRS in the SRS sub-frame; or in the SRS sub-frame, if the transmission frequency resources of an SRS partially overlap with the narrowband for transmitting a PRACH in the adjacent uplink sub-frame subsequent to the SRS sub-frame, and a TA value corresponding to the SRS sub-frame is less than a retuning period of time, to decide not to transmit an SRS in the SRS sub-frame; or in the SRS sub-frame, if the transmission frequency resources of an SRS partially overlap with the narrowband for transmitting a PRACH in the adjacent uplink sub-frame subsequent to the SRS sub-frame, and a TA value corresponding to the SRS sub-frame is less than a retuning period of time, to decide not to transmit an SRS over frequency resources, which do not overlap with the narrowband for transmitting uplink data, among the transmission frequency resources of an SRS.

Optionally the processor is configured: if a narrowband for transmitting uplink data in the SRS sub-frame is different from a narrowband for transmitting uplink data in an adjacent uplink sub-frame subsequent to the SRS sub-frame, to decide not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in both of the narrowband for transmitting uplink data in the SRS sub-frame and the narrowband for transmitting uplink data in the adjacent uplink sub-frame subsequent to the SRS sub-frame, to decide not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which does not overlap with transmission frequency resources of an SRS, among the narrowband for transmitting uplink data in the SRS sub-frame, and the narrowband for transmitting uplink data in the adjacent uplink sub-frame subsequent to the SRS sub-frame, to decide not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which partially overlaps with transmission frequency resources of an SRS, among the narrowband for transmitting uplink data in the SRS sub-frame and the narrowband for transmitting uplink data in the adjacent uplink sub-frame subsequent to the SRS sub-frame, to decide not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which partially overlaps with transmission frequency resources of an SRS, among the narrowband for transmitting uplink data in the SRS sub-frame and the narrowband for transmitting uplink data in the adjacent uplink sub-frame subsequent to the SRS sub-frame, to decide not to transmit an SRS over frequency resources, which do not overlap with the narrowband in which there are uplink data transmitted, among the transmission frequency resources of an SRS.

Optionally the processor is configured: in a special sub-frame of a Time Division Duplex (TDD) system, if transmission frequency resources of an SRS in an Uplink Pilot Time Slot (UpPTS) do not overlap with a narrowband for transmitting downlink data in a Downlink Pilot Time Slot (DwPTS), to decide not to transmit an SRS in the UpPTS of the special sub-frame; or in a special sub-frame of a TDD system, if transmission frequency resources of an SRS in an UpPTS do not overlap with a narrowband for transmitting downlink data in a DwPTS, and there are downlink data transmitted in the DwPTS, to decide not to transmit an SRS in the UpPTS of the special sub-frame; or in a special sub-frame of a TDD system, if transmission frequency resources of an SRS in an UpPTS partially overlap with a narrowband for transmitting downlink data in a DwPTS, to decide not to transmit an SRS in the UpPTS of the special sub-frame; or in a special sub-frame of a TDD system, if transmission frequency resources of an SRS in an UpPTS partially overlap with a narrowband for transmitting downlink data in a DwPTS, and there are downlink data transmitted in the DwPTS, to decide not to transmit an SRS in the UpPTS of the special sub-frame; or in a special sub-frame of a TDD system, if transmission frequency resources of an SRS in an UpPTS partially overlap with a narrowband for transmitting downlink data in a DwPTS, to decide not to transmit an SRS over frequency resources, which do not overlap with the narrowband for transmitting downlink data in the DwPTS, among the transmission frequency resources of an SRS; or in a special sub-frame of a TDD system, if transmission frequency resources of an SRS in an UpPTS partially overlap with a narrowband for transmitting downlink data in a DwPTS, and there are downlink data transmitted in the DwPTS, to decide not to transmit an SRS over frequency resources, which do not overlap with the narrowband for transmitting downlink data in the DwPTS, among the transmission frequency resources of an SRS.

Optionally the processor is configured: if a narrowband for transmitting downlink data in a DwPTS of a special sub-frame of a TDD system is different from a narrowband for transmitting uplink data in an adjacent uplink sub-frame subsequent to the special sub-frame, to decide not to transmit an SRS in an UpPTS of the special sub-frame; or if a narrowband for transmitting downlink data in a DwPTS of a special sub-frame of a TDD system is different from a narrowband for transmitting uplink data in an adjacent uplink sub-frame subsequent to the special sub-frame, and there are data transmitted in both of the DwPTS of the special sub-frame and the adjacent uplink sub-frame subsequent to the special sub-frame, to decide not to transmit an SRS in an UpPTS of the special sub-frame.

Optionally the uplink data include data transmitted in one or more of following uplink channels: a PUCCH, a PUSCH, and a PRACH.

Optionally the downlink data include data transmitted in one or more of following downlink channels: a PDSCH, an M-PDCCH, a PBCH, and a PMCH.

Optionally the SRS sub-frame is a sub-frame specific to a narrowband terminal, and the SRS sub-frame includes an UpPTS or a normal uplink sub-frame.

In the embodiments above of the invention, the UE can decide whether to transmit an SRS, according to whether transmission frequency resources of an SRS overlap with a narrowband for transmitting data, or whether adjacent narrowbands for transmitting data are the same, that is, there is provided a new SRS transmission rule to address the absence of a definite SRS transmission rule in the prior art particularly when the embodiments of the invention are applied to a low-complexity MTC system.

BRIEF DESCRIPTION OF THE DRAWINGS

In order to make the technical solutions according to the embodiments of the invention more apparent, the drawings to which reference is made in the description of the embodiments will be introduced below in brief, and apparently the drawings to be described below are only some embodiments of the invention, but those ordinarily skilled in the art can further derive from these drawing other drawings without any inventive effort.

DETAILED DESCRIPTION OF THE EMBODIMENTS

As described above, in a low-complexity MTC system, a frequency position where an SRS is transmitted, and a narrowband in which a PUCCH/PUSCH is transmitted can be determined separately, and when an SRS can be transmitted in a frequency hop mode, the SRS is also transmitted at a different frequency position in a different SRS sub-frame, so the frequency position where the SRS is transmitted may not overlap with the narrowband in which the PUCCH/PUSCH adjacent thereto is transmitted in the frequency domain, and there are so limited transmit and receive bandwidths of low-complexity MTC that signals cannot be transmitted and received at different narrowband positions at the same instance of time, and a retuning period of time is required between the different narrowbands to retune a radio frequency element to the different frequency positions, so the SRS transmission rule in the prior art may not be applicable to the low-complexity MTC system any longer, and it is desirable to define a new transmission rule for SRS transmission by a low-complexity MTC terminal.

In order to attain this object, an embodiment of the invention provides an SRS transmission solution. The SRS transmission solution according to the embodiment of the invention can be applicable to various communication systems, e.g., an LTE system, and an LTE-A system, and particularly to a scenario in which a narrowband terminal transmissions an SRS.

Here the narrowband terminal is defined as compared with a terminal with a radio frequency bandwidth of 20 MHz. and the radio frequency bandwidth of the narrowband terminal is less than 20 MNz. For example, the narrowband terminal can be an MTC terminal supporting a radio frequency bandwidth of only 1.4 MHz.

The SRS transmission solution according to the embodiment of the invention will be described below in details by way of an example of a scenario in which a narrowband terminal transmissions an SRS. Unless stated otherwise, a terminal in the following embodiment will refer to an MTC terminal supporting a radio frequency bandwidth of only 1.4 MHz.

Figure 1:
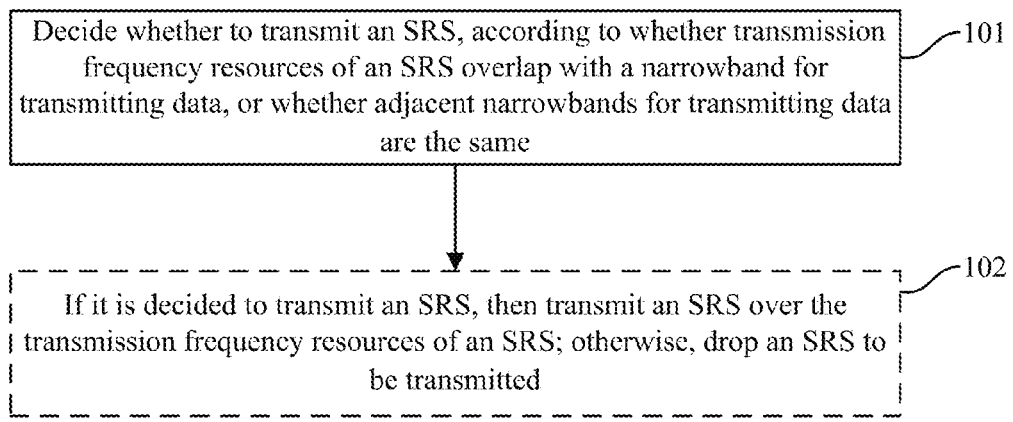
FIG. 1 is a schematic flow chart of transmitting an SRS according to an embodiment of the invention.

Referring to FIG. 1 which is a schematic flow chart of transmitting an SRS according to an embodiment of the invention, the flow can be performed by a terminal.

As illustrated, the flow can include the following steps.

The step 101 is to decide whether to transmit an SRS, according to whether transmission frequency resources of an SRS overlap with a narrowband for transmitting data, or whether adjacent narrowbands for transmitting data are the same.

Here the following several possible decisions can be made about whether to transmit an SRS.

A decision is made not to transmit an SRS (i.e., to drop an SRS).

A decision is made to transmit an SRS.

A decision is made to transmit an SRS over a part of the transmission frequency resources of an SRS, and not to transmit an SRS over the remaining transmission frequency resources (i.e., to drop an SRS over a part thereof).

Here a decision can be made in the step 101 about whether to transmit an SRS, in one or a combination of the following several schemes.

In a scheme 1, a decision is made about whether to transmit an SRS in an SRS sub-frame, according to whether SRS transmission frequency resources in the SRS sub-frame overlap with a narrowband for transmitting uplink data in the SRS sub-frame.

In a scheme 2, a decision is made about whether to transmit an SRS in an SRS sub-frame, according to whether SRS transmission frequency resources in the SRS sub-frame overlap with a narrowband for transmitting uplink data in an adjacent uplink sub-frame subsequent to the SRS sub-frame.

In a scheme 3, a decision is made about whether to transmit an SRS in an SRS sub-frame, according to whether adjacent narrowbands for transmitting uplink data are the same.

In a scheme 4, a decision is made about whether to transmit an SRS in a special sub-frame of a Time Division Duplex (TDD) system, according to whether SRS transmission frequency resources in the special sub-frame overlap with a narrowband for transmitting downlink data in the special sub-frame.

In a scheme 5, a decision is made about whether to transmit an SRS in a special sub-frame of a TDD system, according to whether a narrowband for transmitting downlink data in the special sub-frame is the same as a narrowband for transmitting uplink data in an adjacent uplink sub-frame subsequent to the special sub-frame.

In these several schemes above, the SRS sub-frame can be a sub-frame specific to the narrowband terminal and the SRS sub-frame can include an UpPTS or a normal uplink sub-frame.

In these several schemes above, the uplink data above can be transmitted in an uplink channel, and correspondingly the uplink channel can include one or more of the following channels: a PUCCH, a PUSCH, and a Physical Random Access Channel (PRACH), where the PRACH is primarily applicable in a contention-free scenario.

In these several schemes above, the downlink data can be transmitted in a downlink channel, and correspondingly the downlink channel can include one or more of the following channels: a Physical Downlink Shared Channel (PDSCH), an MTC Physical Downlink Control Channel (M-PDCCH), a Physical Broadcast Channel (PBCH), and a Physical Multicast Channel (PMCH), where the M-PDCCH can be a downlink control channel defined for the narrowband terminal.

In the flow above, "overlap(s)" refers to overlapping in the frequency domain, and for example, given a frequency range A and a frequency range B, if there are the same values in a part of the frequency range A as those in a part of the frequency range B, then it will be determined that the frequency range A overlaps with the frequency range B, or they partially overlap with each other; and if none of values in the frequency range is the same as any one of values in the frequency range B, then it will be determined that the frequency range A does not overlap with the frequency range B. Optionally the frequency ranges above can be sets of PRBs.

Furthermore after a decision is made about whether to transmit an SRS, the method can further include the following step (denoted in the dotted box as illustrated).

The step 102 is, if it is decided in the step 101 to transmit an SRS, to transmit an SRS over the transmission frequency resources of an SRS; otherwise, to drop an SRS to be transmitted. Alternatively an SRS can be transmitted over a part of the transmission frequency resources of an SRS, and drop the SRS over the remaining transmission frequency resources, according to the decision in the step 101.

Optional implementations of the scheme 1 to the scheme 5 above will be described below in details respectively.

Scheme 1.

In the scheme 1, the terminal can decide whether to transmit an SRS (e.g., to drop an SRS) in an SRS sub-frame, according to whether SRS transmission frequency resources in the SRS sub-frame overlap with a narrowband for transmitting uplink data in the SRS sub-frame, where the "narrowband for transmitting uplink data" can be expressed as a "narrowband for transmitting an uplink channel", and the uplink channel can include a PUCCH, a PUSCH, etc.

Optionally the scheme 1 can be further categorized into the following several implementations.

In a scheme 1-1, in an SRS sub-frame, if transmission frequency resources of an SRS do not overlap with a narrowband for transmitting uplink data, then it will be decided not to transmit an SRS in the SRS sub-frame.

For example, an SRS is transmitted in corresponding PRB8 to PRB11 in an uplink sub-frame 2, and a narrowband for transmitting an uplink channel (e.g., a PUCCH or a PUSCH, which will apply hereinafter) in the uplink sub-frame 2 is a narrowband 0 (PRB2 to PRB7). In this instance, since the PRBs in which an SRS is transmitted in the uplink sub-frame 2 do not overlap with the narrowband for transmitting an uplink channel in the uplink sub-frame 2, no SRS is transmitted (that is, an SRS is dropped) in the uplink sub-frame 2, that is, no SRS is transmitted in the uplink sub-frame 2 no matter whether there is an uplink channel transmitted therein. Optionally in the SRS sub-frame, if the transmission frequency resources of an SRS overlap with the narrowband for transmitting uplink data, then there still may be an occasion to transmit an SRS in the uplink sub-frame 2; and for example, an SRS may be transmitted in corresponding PRB2 to PRB5 in the uplink sub-frame 2, and at this time, all the PRBs in which an SRS is transmitted lie in the narrowband 0 for transmitting uplink data, and neither the SRS resources nor the narrowband for transmitting uplink data in the SRS sub-frame will be retuned to each other, so an SRS can be transmitted in the uplink sub-frame 2, or a decision about whether to transmit an SRS can be further made in combination with another scheme (e.g., the scheme 2). In another example, there still may be an occasion to transmit an SRS over a part of the frequency resources, in the instances in the following schemes 1-4 and 1-6.

In a scheme 1-2, in an SRS sub-frame, if transmission frequency resources of an SRS do not overlap with a narrowband for transmitting uplink data, and there is uplink data transmitted in the SRS sub-frame, then it will be decided not to transmit an SRS in the SRS sub-frame.

For example, an SRS is transmitted in corresponding PRB8 to PRB11 in an uplink sub-frame 2, and a narrowband for transmitting an uplink channel in the uplink sub-frame 2 is a narrowband 0 (PRB2 to PRB7). In this instance, if there is an uplink channel transmitted in the uplink sub-frame 2 indeed, then no SRS will be transmitted. Optionally in this instance, if there is no uplink channel transmitted in the uplink sub-frame 2, or the transmission frequency resources of an SRS overlap with the narrowband for transmitting uplink data (reference can be made to the corresponding description in the scheme 1-1 above for an example thereof), then there still may be an occasion for transmitting an SRS, and for example, it may be simply defined that an SRS can be transmitted at that time, or a decision about whether to transmit an SRS can be further made in combination with another scheme (e.g., the scheme 2).

In a scheme 1-3, in an SRS sub-frame, if transmission frequency resources of an SRS partially overlap with a narrowband for transmitting uplink data, then it will be decided not to transmit an SRS in the SRS sub-frame.

For example, an SRS is transmitted in corresponding PRB6 to PRB9 in an uplink sub-frame 2, and a narrowband for transmitting an uplink channel in the uplink sub-frame 2 is a narrowband 0 (PRB2 to PRB7). In this instance, since the PRBs in which an SRS is transmitted in the uplink sub-frame 2 partially overlap with the narrowband for transmitting an uplink channel in the uplink sub-frame 2, then no SRS will be transmitted in the uplink sub-frame 2.

In a scheme 1-4, in an SRS sub-frame, if transmission frequency resources of an SRS partially overlap with a narrowband for transmitting uplink data, then it will be decided not to transmit an SRS over frequency resources, which do not overlap with the narrowband for transmitting uplink data, among the transmission frequency resources of an SRS.

For example, an SRS is transmitted in corresponding PRB6 to PRB9 in an uplink sub-frame 2, and a narrowband for transmitting an uplink channel in the uplink sub-frame 2 is a narrowband 0 (PRB2 to PRB7). In this instance, since the PRBs in which an SRS is transmitted in the uplink sub-frame 2 partially overlap with the narrowband for transmitting an uplink channel in the uplink sub-frame 2, then no SRS will be transmitted in the PRB8 and the PRB9 in the uplink sub-frame 2. Optionally there still may be an occasion to transmit an SRS in the PRB6 and the RPB7 in the uplink sub-frame 2, and for example, it may be simply defined that an SRS can be transmitted in the PRBs overlapping with the narrowband at that time, or a decision about whether to transmit an SRS in the PRBs overlapping with the narrowband can be further made in combination with another scheme (e.g., the scheme 2). That is, a decision about whether to transmit an SRS is made as in the scheme above no matter whether there is an uplink channel transmitted in the uplink sub-frame 2.

In a scheme 1-5, in an SRS sub-frame, if transmission frequency resources of an SRS partially overlap with a narrowband for transmitting uplink data, and there is uplink data transmitted in the SRS sub-frame, then it will be decided not to transmit an SRS in the SRS sub-frame.

For example, an SRS is transmitted in corresponding PRB6 to PRB9 in an uplink sub-frame 2, and a narrowband for transmitting an uplink channel in the uplink sub-frame 2 is a narrowband 0 (PRB2 to PRB7). In this instance, if there is an uplink channel transmitted in the uplink sub-frame 2 indeed, then no SRS will be transmitted in the uplink sub-frame 2. Optionally in this instance, if there is no uplink channel transmitted in the uplink sub-frame 2, then there still may be an occasion to transmit an SRS in the uplink sub-frame 2, and for example, it may be simply defined that an SRS can be transmitted at that time, or a decision about whether to transmit an SRS can be further made in combination with another scheme (e.g., the scheme 2).

In a scheme 1-6, in an SRS sub-frame, if transmission frequency resources of an SRS partially overlap with a narrowband for transmitting uplink data, and there are uplink data transmitted in the SRS sub-frame, then it will be decided not to transmit an SRS over frequency resources, which do not overlap with the narrowband for transmitting uplink data, among the transmission frequency resources of an SRS.

For example, an SRS is transmitted in corresponding PRB6 to PRB9 in an uplink sub-frame 2, and a narrowband for transmitting an uplink channel in the uplink sub-frame 2 is a narrowband 0 (PRB2 to PRB7). In this instance, if there is an uplink channel transmitted in the uplink sub-frame 2 indeed, then no SRS will be transmitted in the PRB8 and the PRB9 in the uplink sub-frame 2. Optionally there still may be an occasion to transmit an SRS in the PRB6 and the RPB7 in the uplink sub-frame 2, and for example, it may be simply defined that an SRS can be transmitted in the PRBs overlapping with the narrowband at that time, or a decision about whether to transmit an SRS in the PRBs overlapping with the narrowband can be further made in combination with another scheme (e.g., the scheme 2). Optionally in the instance above, if there is no uplink channel transmitted in the uplink sub-frame 2, then there still may be an occasion to transmit an SRS in the uplink sub-frame 2, and for example, it may be simply defined that an SRS can be transmitted at that time, or a decision about whether to transmit an SRS can be further made in combination with another scheme (e.g., the scheme 2).

Scheme 2.

In the scheme 2, the terminal can decide whether to transmit an SRS (e.g., to drop an SRS) in an SRS sub-frame, according to whether SRS transmission frequency resources in the SRS sub-frame overlap with a narrowband for transmitting uplink data in an adjacent uplink sub-frame subsequent to the SRS sub-frame, where the "narrowband for transmitting uplink data" can be expressed as a "narrowband for transmitting an uplink channel", and the uplink channel can include a PUCCH, a PUSCH, etc.

Optionally the scheme 2 can be further categorized into the following several implementations.

In a scheme 2-1, in an SRS sub-frame, if transmission frequency resources of an SRS do not overlap with a narrowband for transmitting uplink data in an adjacent uplink sub-frame subsequent to the SRS sub-frame, then it will be decided not to transmit an SRS in the SRS sub-frame.

For example, an SRS is transmitted in corresponding PRB8 to PRB11 in an uplink sub-frame 2, and a narrowband for transmitting an uplink channel (e.g., a PUCCH or a PUSCH, which will apply hereinafter) in an uplink sub-frame 3 is a narrowband 0 (PRB2 to PRB7). In this instance, since the PRBs in which an SRS is transmitted in the uplink sub-frame 2 do not overlap with the narrowband for transmitting an uplink channel in the uplink sub-frame 3, no SRS is transmitted in the uplink sub-frame 2, that is, no SRS is transmitted no matter whether there is an uplink channel transmitted in the uplink sub-frame 3. Optionally in the SRS sub-frame, if the transmission frequency resources of an SRS overlap with the narrowband for transmitting uplink data in the adjacent uplink sub-frame subsequent to the SRS sub-frame, then there still may be an occasion to transmit an SRS in the uplink sub-frame 2; and for example, an SRS may be transmitted in corresponding PRB2 to PRB5 in the uplink sub-frame 2, and at this time, all the PRBs in which an SRS is transmitted lie in the narrowband 0 for transmitting uplink data, and the SRS resources and the narrowband for transmitting uplink data in the SRS sub-frame will not be retuned to each other, so an SRS can be transmitted in the uplink sub-frame 2, or a decision about whether to transmit an SRS can be further made in combination with another scheme (e.g., the scheme 2). In another example, there still may be an occasion to transmit an SRS over a part of the frequency resources, in the instances in the following schemes 2-4 and 2-6.

In a scheme 2-2, in an SRS sub-frame, if transmission frequency resources of an SRS do not overlap with a narrowband for transmitting uplink data in an adjacent uplink sub-frame subsequent to the SRS sub-frame, and there are uplink data transmitted in the adjacent uplink sub-frame subsequent to the SRS sub-frame, then it will be decided not to transmit an SRS in the SRS sub-frame.

For example, an SRS is transmitted in corresponding PRB8 to PRB11 in an uplink sub-frame 2, and a narrowband for transmitting an uplink channel in the uplink sub-frame 3 is a narrowband 0 (PRB2 to PRB7). In this instance, if there is an uplink channel transmitted in the uplink sub-frame 3 indeed, then no SRS will be transmitted in the sub-frame 2.

Optionally in this instance, if there is no uplink channel transmitted in the uplink sub-frame 3, or the transmission frequency resources of an SRS overlap with the narrowband for transmitting uplink data (reference can be made to the corresponding description in the scheme 2-1 above for an example thereof), then there still may be an occasion to transmit an SRS in the sub-frame 2, and for example, it may be simply defined that an SRS can be transmitted at that time, or a decision about whether to transmit an SRS can be further made in combination with another scheme (e.g., the scheme 1).

In a scheme 2-3, in an SRS sub-frame, if transmission frequency resources of an SRS partially overlap with a narrowband for transmitting uplink data in an adjacent uplink sub-frame subsequent to the SRS sub-frame, then it will be decided not to transmit an SRS in the SRS sub-frame.

For example, an SRS is transmitted in corresponding PRB6 to PRB9 in an uplink sub-frame 2, and a narrowband for transmitting an uplink channel in the uplink sub-frame 3 is a narrowband 0 (PRB2 to PRB7). In this instance, since the PRBs in which an SRS is transmitted in the uplink sub-frame 2 partially overlap with the narrowband for transmitting an uplink channel in the uplink sub-frame 3, then no SRS will be transmitted in the uplink sub-frame 2.

In a scheme 2-4, in an SRS sub-frame, if transmission frequency resources of an SRS partially overlap with a narrowband for transmitting uplink data in an adjacent uplink sub-frame subsequent to the SRS sub-frame, then it will be decided not to transmit an SRS over frequency resources, which do not overlap with the narrowband for transmitting uplink data, among the transmission frequency resources of an SRS.

For example, an SRS is transmitted in corresponding PRB6 to PRB9 in an uplink sub-frame 2, and a narrowband for transmitting an uplink channel in the uplink sub-frame 3 is a narrowband 0 (PRB2 to PRB7). In this instance, no SRS is transmitted in the PRB8 and the PRB9 in the uplink sub-frame 2. Optionally there still may be an occasion to transmit an SRS in the PRB6 and the RPB7 in the uplink sub-frame 2, and for example, it may be simply defined that an SRS can be transmitted in the PRBs overlapping with the narrowband at that time, or a decision about whether to transmit an SRS in the PRBs overlapping with the narrowband can be further made in combination with another scheme (e.g., the scheme 1). That is, a decision is made about whether to transmit an SRS, as in the scheme above no matter whether there is an uplink channel transmitted in the uplink sub-frame 3.

In a scheme 2-5, in an SRS sub-frame, if transmission frequency resources of an SRS partially overlap with a narrowband for transmitting uplink data in an adjacent uplink sub-frame subsequent to the SRS sub-frame, and there are uplink data transmitted in the adjacent uplink sub-frame subsequent to the SRS sub-frame, then it will be decided not to transmit an SRS in the SRS sub-frame.

For example, an SRS is transmitted in corresponding PRB6 to PRB9 in an uplink sub-frame 2, and a narrowband for transmitting an uplink channel in the uplink sub-frame 3 is a narrowband 0 (PRB2 to PRB7). In this instance, if there is an uplink channel transmitted in the uplink sub-frame 3 indeed, then no SRS will be transmitted in the uplink sub-frame 2. Optionally in this instance, if there is no uplink channel transmitted in the uplink sub-frame 3, then there still may be an occasion to transmit an SRS in the uplink sub-frame 2, and for example, it may be simply defined that an SRS can be transmitted at that time, or a decision about whether to transmit an SRS can be further made in combination with another scheme (e.g., the scheme 1).

In a scheme 2-6, in an SRS sub-frame, if transmission frequency resources of an SRS partially overlap with a narrowband for transmitting uplink data in an adjacent uplink sub-frame subsequent to the SRS sub-frame, and there are uplink data transmitted in the adjacent uplink sub-frame subsequent to the SRS sub-frame, then it will be decided not to transmit an SRS over frequency resources, which do not overlap with the narrowband for transmitting uplink data, among the transmission frequency resources of an SRS.

For example, an SRS is transmitted in corresponding PRB6 to PRB9 in an uplink sub-frame 2, and a narrowband for transmitting an uplink channel in the uplink sub-frame 3 is a narrowband 0 (PRB2 to PRB7). In this instance, if there is an uplink channel transmitted in the uplink sub-frame 3 indeed, then no SRS will be transmitted in the PRB8 and the PRB9 in the uplink sub-frame 2. Optionally there still may be an occasion to transmit an SRS in the PRB6 and the RPB7 in the uplink sub-frame 2, and for example, it may be simply defined that an SRS can be transmitted in the PRBs overlapping with the narrowband at that time, or a decision about whether to transmit an SRS in the PRBs overlapping with the narrowband can be further made in combination with another scheme (e.g., the scheme 1). Optionally in the instance above, if there is no uplink channel transmitted in the uplink sub-frame 3, then there still may be an occasion to transmit an SRS in the uplink sub-frame 2, and for example, it may be simply defined that an SRS can be transmitted at that time, or a decision about whether to transmit an SRS can be further made in combination with another scheme (e.g., the scheme 1).

In some embodiment, optionally if an uplink channel transmitted in the adjacent uplink sub-frame subsequent to the SRS sub-frame is a PRACH, then a decision may be further made about whether to transmit an SRS, in one of the following schemes.

In the SRS sub-frame, if the transmission frequency resources of an SRS do not overlap with the narrowband for transmitting a PRACH in the adjacent uplink sub-frame subsequent to the SRS sub-frame, and a Timing Advance (TA) value corresponding to the SRS sub-frame is less than a retuning period of time, then it will be decided not to transmit an SRS in the SRS sub-frame, where the retuning period of time refers to a period of time for the narrowband terminal to be switched between different frequency positions or narrowbands to transmit and receive data, and typically a period of time for a radio frequency element to be retuned from one frequency to another frequency, e.g., with the length of at most two Orthogonal Frequency Division Multiplexing (OFDM) symbols as currently identified, where the length includes the length of a Cyclic Prefix (CP).

In the SRS sub-frame, if the transmission frequency resources of an SRS partially overlap with the narrowband for transmitting a PRACH in the adjacent uplink sub-frame subsequent to the SRS sub-frame, and a TA value corresponding to the SRS sub-frame is less than a retuning period of time, then it will be decided not to transmit an SRS in the SRS sub-frame.

In the SRS sub-frame, if the transmission frequency resources of an SRS partially overlap with the narrowband for transmitting a PRACH in the adjacent uplink sub-frame subsequent to the SRS sub-frame, and a TA value corresponding to the SRS sub-frame is less than a retuning period of time, then it will be decided not to transmit an SRS over frequency resources, which do not overlap with the narrowband for transmitting uplink data, among the transmission frequency resources of an SRS.

Scheme 3.

In the scheme 3, the terminal can decide whether to transmit an SRS (e.g., to drop an SRS) in an SRS sub-frame, according to whether adjacent narrow bands for transmitting data are the same. Optionally the "narrowband for transmitting data" can be a narrowband for transmitting uplink data, where the "narrowband for transmitting uplink data" can be expressed as a "narrowband for transmitting an uplink channel", and the uplink channel can include a PUCCH, a PUSCH, a PRACH, etc.

Optionally the scheme 3 can be further categorized into the following several implementations.

In a scheme 3-1, if a narrowband for transmitting uplink data in the SRS sub-frame is different from a narrowband for transmitting uplink data in an adjacent uplink sub-frame subsequent to the SRS sub-frame, then it will be decided not to transmit an SRS in the SRS sub-frame.

For example, an SRS is transmitted in corresponding PRB8 to PRB11 in an uplink sub-frame 2, a narrowband for transmitting an uplink channel in the uplink sub-frame 2 is a narrowband 1 (PRB8 to PRB13), and a narrowband for transmitting an uplink channel in an uplink sub-frame 3 is a narrowband 0 (PRB2 to PRB7); and it is firstly determined whether the narrowbands of the adjacent uplink sub-frames are the same, before a decision is made about whether the SRS transmission resources overlap with the narrowband. Since the narrowbands for transmitting an uplink channel in the uplink sub-frame 2 and the uplink sub-frame 3 are different, no SRS is transmitted in the uplink sub-frame 2, these transmission resources of an SRS in the uplink sub-frame 2 can be used for a corresponding retuning period of time between the different narrowbands of the adjacent uplink sub-frames. Optionally if the narrowband for transmitting an uplink channel in the uplink sub-frame 2 is the same as the narrowband for transmitting an uplink channel in the uplink sub-frame 3, then there still may be an occasion to transmit an SRS in the uplink sub-frame 2, and optionally a decision about whether to transmit an SRS can be further made according to a relationship between the transmission frequency resources of an SRS and the narrowband for transmitting an uplink channel in the uplink sub-frame 2, and optionally can be further made in combination with the scheme 1. For example, if both of the narrowbands for transmitting uplink data in the uplink sub-frames 2 and 3 are the narrowband 1, and the PRBs for transmitting an SRS lie in the narrowband 1, then an SRS can be transmitted; and if both of the narrowbands for transmitting uplink data in the uplink sub-frames 2 and 3 are the narrowband 0, and an SRS is transmitted in the corresponding PRB6 to PRB9 in the uplink sub-frame 2, then an SRS cannot be transmitted, or cannot be transmitted in at least the PRB8 to PRB9. A decision about whether to transmit an SRS can be further made taking into account whether there is an uplink channel transmitted in the sub-frame 2, as in the scheme 1.

In a scheme 3-2, if a narrowband for transmitting uplink data in the SRS sub-frame is different from a narrowband for transmitting uplink data in an adjacent uplink sub-frame subsequent to the SRS sub-frame, and there are uplink data transmitted in both the narrowband for transmitting uplink data in the SRS sub-frame and the narrowband for transmitting uplink data in the adjacent uplink sub-frame subsequent to the SRS sub-frame, then it will be decided not to transmit an SRS in the SRS sub-frame.

For example, an SRS is transmitted in corresponding PRB8 to PRB11 in an uplink sub-frame 2, a narrowband for transmitting an uplink channel in the uplink sub-frame 2 is a narrowband 1 (PRB8 to PRB13), and a narrowband for transmitting an uplink channel in an uplink sub-frame 3 is a narrowband 0 (PRB2 to PRB7). In this instance, if there are uplink data transmitted in both the narrowband 1 in the uplink sub-frame 2, and the narrowband 0 in the uplink sub-frame 3, then no SRS will be transmitted in the uplink sub-frame 2. Optionally if there are no uplink data transmitted in the narrowband 1 in the uplink sub-frame 2, or the narrowband 0 in the uplink sub-frame 3, then there still may be an occasion to transmit an SRS in the uplink sub-frame 2, and for example, if there are no data transmitted in the uplink sub-frame 3, and the PRBs for an SRS lie in the narrowband 1 for transmitting an uplink channel in the uplink sub-frame 2, that is, no retuning is required between an uplink channel and an SRS in the uplink sub-frame 2, then although the narrowband in the uplink sub-frame 3 is different from that in the uplink sub-frame 2, OFDM symbols including an SRS will not be used for retuning when there is no channel transmitted in the uplink sub-frame 3, so an SRS can be transmitted in the uplink sub-frame 2, and at this time, an SRS can be transmitted in the uplink sub-frame 2 no matter whether there are data transmitted in the uplink sub-frame 2. In another example, if the narrowband for transmitting an uplink channel in the uplink sub-frame 2 is the narrowband 0, the narrowband for transmitting an uplink channel in the uplink sub-frame 3 is the narrowband 1, and the PRBs for an SRS lie in the narrowband 1 for transmitting an uplink channel in the uplink sub-frame 3, then since there is no channel transmitted in the uplink sub-frame 2, idle OFDM symbols preceding to an SRS in the uplink sub-frame 2 may be used for retuning, and no retuning will be required between an SRS and an uplink channel in the uplink sub-frame 3, so an SRS can be transmitted in the uplink sub-frame 2. Optionally when the narrowbands in the uplink sub-frame 2 and the uplink sub-frame 3 are the same, there still may be an occasion to transmit an SRS in the uplink sub-frame 2, and optionally a decision about whether to transmit an SRS will be further made according to a relationship between the transmission frequency resources of an SRS and the narrowband for transmitting an uplink channel in the uplink sub-frame 2, and particularly can be further made in combination with the scheme 1, e.g., in the example as described in the scheme 3-1, or can be further made taking into account whether there is an uplink channel transmitted in the sub-frame 2, as in the scheme 1.

In a scheme 3-3, if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which does not overlap with transmission frequency resources of an SRS, among the narrowband for transmitting uplink data in the SRS sub-frame, and the narrowband for transmitting uplink data in the adjacent uplink sub-frame subsequent to the SRS sub-frame, then it will be decided not to transmit an SRS in the SRS sub-frame.

For example, an SRS is transmitted in corresponding PRB8 to PRB11 in an uplink sub-frame 2, a narrowband for transmitting an uplink channel in the uplink sub-frame 2 is a narrowband 1 (PRB8 to PRB13), and a narrowband for transmitting an uplink channel in an uplink sub-frame 3 is a narrowband 0 (PRB2 to PRB7), where the narrowband 0 in the uplink sub-frame 3 does not overlap with the transmission frequency resources of an SRS. In this instance, if there is an uplink channel transmitted in the narrowband 0 in the uplink sub-frame 3, then no SRS will be transmitted in the uplink sub-frame 2. Optionally in the assumption above, if there are no uplink data transmitted in the narrowband 0 in the uplink sub-frame 3, then there still may be an occasion to transmit an SRS in the uplink sub-frame 2, and for example, in the assumption above, the PRBs for an SRS lie in the narrowband 1 in the uplink sub-frame 2, so no retuning is required between an SRS and an uplink channel in the uplink sub-frame 2, and when there is no uplink channel transmitted in the uplink sub-frame 3, OFDM symbols including an SRS will not be used for retuning between the different narrowbands, so an SRS can be transmitted in the uplink sub-frame 2 at that time. Optionally when the narrowbands in the uplink sub-frame 2 and the uplink sub-frame 3 are the same, there still may be an occasion to transmit an SRS in the uplink sub-frame 2, and optionally a decision about whether to transmit an SRS will be further made according to a relationship between the transmission frequency resources of an SRS and the narrowband for transmitting an uplink channel in the uplink sub-frame 2, and optionally can be further made in combination with the scheme 1, e.g., in the example as described in the scheme 3-1, or can be further made taking into account whether there is an uplink channel transmitted in the sub-frame 2, as in the scheme 1.

In a scheme 3-4, if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which partially overlaps with transmission frequency resources of an SRS, among the narrowband for transmitting uplink data in the SRS sub-frame, and the narrowband for transmitting uplink data in the adjacent uplink sub-frame subsequent to the SRS sub-frame, then it will be decided not to transmit an SRS in the SRS sub-frame.

For example, an SRS is transmitted in corresponding PRB6 to PRB9 in an uplink sub-frame 2, a narrowband for transmitting an uplink channel in the uplink sub-frame 2 is a narrowband 1 (PRB8 to PRB13), and a narrowband for transmitting an uplink channel in an uplink sub-frame 3 is a narrowband 0 (PRB2 to PRB7), where the narrowband 1 in the uplink sub-frame 2 and the narrowband 0 in the uplink sub-frame 3 partially overlap respectively with the transmission frequency resources of an SRS. In this instance, if there is an uplink channel transmitted in both the narrowband 1 in the uplink sub-frame 2, and the narrowband 0 in the uplink sub-frame 3, then no SRS will be transmitted in the uplink sub-frame 2. Optionally if there are no uplink data transmitted in the narrowband 1 in the uplink sub-frame 2, and/or the narrowband 0 in the uplink sub-frame 3, then there still may be an occasion to transmit an SRS in the uplink sub-frame 2, and for example, when there are no uplink data transmitted in the narrowband 1 in the uplink sub-frame 2, no retuning is required between an SRS in the PRB6 and the PRB7 and the narrowband 0 in the uplink sub-frame 3, and OFDM symbols preceding to an SRS in the uplink sub-frame 2 can be used for retuning from the narrowband 0 to the narrowband 1, so an SRS can be transmitted in the PRB6 and the PRB7, and at this time, an SRS can be transmitted in the PRB6 and the PRB7 no matter whether there are uplink data transmitted in the narrowband 0 in the uplink sub-frame 3. In another example, when there are no uplink data transmitted in the narrowband 0 in the uplink sub-frame 3, no retuning is required between an SRS in the PRB8 and the PRB9, and the narrowband 1 in the uplink sub-frame 2, and when there is no uplink channel transmitted in the uplink sub-frame 3, the SRS positions in the sub-frame 2 will be not used for retuning between the narrowband 1 and the narrowband 0, so an SRS can be transmitted in the PRB8 and the PRB9, and at this time, an SRS can be transmitted in the PRB8 and the PRB9 no matter whether there are uplink data transmitted in the narrowband 1 in the uplink sub-frame 2. In still another example, when there are no uplink data transmitted in the narrowband 1 in the uplink sub-frame 2, and the narrowband 0 in the uplink sub-frame 3, one of the two instances above may apply, that is, an SRS can be transmitted in the PRB6 and the PRB7, or an SRS can be transmitted in the PRB8 and the PRB9, but since the narrowband terminal can only transmit and receive in a defined narrowband, it will not transmit any SRS concurrently in the narrowbands 0 and 1, so it will not transmit any SRS concurrently in the PRB6 and the PRB7, and the PRB8 and the PRB9. Optionally when the narrowbands in the uplink sub-frame 2 and the uplink sub-frame 3 are the same, there still may be an occasion to transmit an SRS in the uplink sub-frame 2, and optionally a decision about whether to transmit an SRS will be further made according to a relationship between the transmission frequency resources of an SRS, and the narrowband for transmitting an uplink channel in the uplink sub-frame 2, and optionally can be further made in combination with the scheme 1, e.g., in the example as described in the scheme 3-1, or can be further made taking into account whether there is an uplink channel transmitted in the sub-frame 2, as in the scheme 1.

In a scheme 3-5, if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which partially overlaps with transmission frequency resources of an SRS, among the narrowband for transmitting uplink data in the SRS sub-frame, and the narrowband for transmitting uplink data in the adjacent uplink sub-frame subsequent to the SRS sub-frame, then it will be decided not to transmit an SRS over frequency resources, which do not overlap with the narrowband in which there are uplink data transmitted, among the transmission frequency resources of an SRS.

For example, an SRS is transmitted in corresponding PRB12 to PRB15 in an uplink sub-frame 2, a narrowband for transmitting an uplink channel in the uplink sub-frame 2 is a narrowband 1 (PRB8 to PRB13), and a narrowband for transmitting an uplink channel in an uplink sub-frame 3 is a narrowband 0 (PRB2 to PRB7), where the narrowband 1 in the uplink sub-frame 2 partially overlaps with the transmission frequency resources of an SRS, and the narrowband 0 in the uplink sub-frame 3 does not overlap with the transmission frequency resources of an SRS. In this instance, if there is an uplink channel transmitted in the narrowband 1 in the uplink sub-frame 2, then no SRS will be transmitted in the PRB14 and the PRB15 in the uplink sub-frame. Furthermore there still may be an occasion to transmit an SRS in the PRB12 and the PRB13 in the uplink sub-frame 2, and optionally a decision about whether to transmit an SRS will be further made according to a relationship between the transmission frequency resources of an SRS, and the narrowband for transmitting an uplink channel in the uplink sub-frame 3, and optionally can be further made in combination with the scheme 2, where, for example, a decision can be made not to transmit an SRS, simply because the transmission frequency resources of an SRS do not overlap with the narrowband in the uplink sub-frame 2; or a decision about whether to transmit an SRS can be further made according to whether there are uplink data in the uplink sub-frame 3, where if there are uplink data in the uplink sub-frame 3, then it will be decided not to transmit an SRS, and if there are no uplink data in the uplink sub-frame 3, then the SRS positions in the sub-frame 2 will be not used for retuning between the narrowbands, so an SRS can be transmitted in the PRB12 and the PRB13 overlapping with the narrowband 1. Optionally, if there are no uplink data transmitted in the narrowband 1 in the uplink sub-frame 2, then there still may be an occasion to transmit an SRS in the PRB12 and the PRB13, or the PRB14 and the PRB15, in the uplink sub-frame 2, and optionally a decision about whether to transmit an SRS will be further made according to a relationship between the transmission frequency resources of an SRS and the narrowband for transmitting an uplink channel in the uplink sub-frame 3, and optionally can be further made in combination with the scheme 2, where, for example, a decision can be made not to transmit an SRS, simply because the transmission frequency resources of an SRS do not overlap with the narrowband in the uplink sub-frame 3; or a decision about whether to transmit an SRS can be further made according to whether there are uplink data in the uplink sub-frame 3, where if there are uplink data in the uplink sub-frame 3, then it will be decided not to transmit an SRS, and if there are no uplink data in the uplink sub-frame 3, then the SRS positions in the sub-frame 2 will be not used for retuning between the narrowbands, so an SRS can be transmitted in the PRB12 and the PRB13 overlapping with the narrowband 1, or can be transmitted in the PRB14 and the PRB15, which do not overlap with the narrowbands 0 and 1 (at this time, the PRB14 and the PRB15 lie in the narrowband 3). Optionally when the narrowbands in the uplink sub-frame 2 and the uplink sub-frame 3 are the same, there still may be an occasion to transmit an SRS in the uplink sub-frame 2, and optionally a decision about whether to transmit an SRS will be further made according to a relationship between the transmission frequency resources of an SRS and the narrowband for transmitting an uplink channel in the uplink sub-frame 2, and optionally can be further made in combination with the scheme 1, e.g., in the example as described in the scheme 3-1, or can be further made taking into account whether there is an uplink channel transmitted in the sub-frame 2, as in the scheme 1.

Scheme 4.

In the scheme 4, the terminal can make a decision about whether to transmit an SRS (e.g., to drop an SRS) in a special sub-frame of a Time Division Duplex (TDD) system, according to whether SRS transmission frequency resources in the special sub-frame overlap with a narrowband for transmitting downlink data in the special sub-frame, where the "narrowband for transmitting downlink data" can be expressed as a "narrowband for transmitting a downlink channel", and the downlink channel can include a PDSCH, an M-PDCCH, a PBCH, a PMCH, etc.

Optionally the scheme 4 can be further categorized into the following several implementations.

In a scheme 4-1, in a special sub-frame of a TDD system, if transmission frequency resources of an SRS in an Uplink Pilot Time Slot (UpPTS) do not overlap with a narrowband for transmitting downlink data in a Downlink Pilot Time Slot (DwPTS), then it will be decided not to transmit an SRS in the UpPTS of the special sub-frame.

For example, an SRS is transmitted in corresponding PRB8 to PRB11 in an UpPTS of a TDD special sub-frame 1, and a narrowband for transmitting a downlink channel in a DwPTS of the special sub-frame 1 is a narrowband 0 (PRB2 to PRB7); and since the PRBs in which an SRS is transmitted in the special sub-frame 1 do not overlap with the narrowband for transmitting a downlink channel in the special sub-frame 1, no SRS is transmitted in the UpPTS of the special sub-frame 1, that is, a decision about whether to transmit an SRS is made as in the scheme above no matter whether there is really a downlink channel transmitted in the DwPTS of the special sub-frame 1. Optionally if the transmission frequency resources of an SRS in the UpPTS overlap with the narrowband for transmitting downlink data in the DwPTS, then there still may be an occasion to transmit an SRS in the UpPTS of the special sub-frame, and for example, when the SRS resources lie in the narrowband for transmitting downlink data in the DwPTS, then an SRS may be transmitted; and when the SRS resources partially overlap with the narrowband for transmitting downlink data in the DwPTS, an SRS is only not transmitted in a part of the PRBs, but there still may be an occasion to transmit an SRS in the remaining PRBs, as described in the scheme 4-5 or 4-6, or a decision about whether to transmit an SRS is further made in combination with another scheme (e.g., the scheme 2), where an example thereof can be as described in the scheme above, although a repeated description thereof will be omitted here.

In a scheme 4-2, in a special sub-frame of a TDD system, if transmission frequency resources of an SRS in an UpPTS do not overlap with a narrowband for transmitting downlink data in a DwPTS, and there are downlink data transmitted in the DwPTS, then it will be decided not to transmit an SRS in the UpPTS of the special sub-frame.

For example, an SRS is transmitted in corresponding PRB8 to PRB11 in an UpPTS of a TDD special sub-frame 1, and a narrowband for transmitting a downlink channel in a DwPTS of the special sub-frame 1 is a narrowband 0 (PRB2 to PRB7). In this instance, if there is a downlink channel transmitted in the DwPTS, then no SRS will be transmitted in the UpPTS of the special sub-frame 1. Optionally, if there is no downlink channel transmitted in the DwPTS, then there still may be an occasion to transmit an SRS in the UpPTS of the special sub-frame, and optionally it may be simply defined that an SRS can be transmitted at that time, or a decision about whether to transmit an SRS can be further made in combination with another scheme (e.g., the scheme 2).

In a scheme 4-3, in a special sub-frame of a TDD system, if transmission frequency resources of an SRS in an UpPTS partially overlap with a narrowband for transmitting downlink data in a DwPTS, then it will be decided not to transmit an SRS in the UpPTS of the special sub-frame.

For example, an SRS is transmitted in corresponding PRB6 to PRB9 in an UpPTS of a TDD special sub-frame 1, and a narrowband for transmitting a downlink channel in a DwPTS of the special sub-frame 1 is a narrowband 0 (PRB2 to PRB7); and since the PRBs in which an SRS is transmitted in the special sub-frame 1 partially overlap with the narrowband for transmitting a downlink channel in the special sub-frame 1, no SRS is transmitted in the UpPTS of the special sub-frame 1, that is, a decision about whether to transmit an SRS is made as in the scheme above no matter whether there is really a downlink channel transmitted in the DwPTS of the special sub-frame 1.

In a scheme 4-4, in a special sub-frame of a TDD system, if transmission frequency resources of an SRS in an UpPTS partially overlap with a narrowband for transmitting downlink data in a DwPTS, and there is downlink data transmitted in the DwPTS, then it will be decided not to transmit an SRS in the UpPTS of the special sub-frame.

For example, an SRS is transmitted in corresponding PRB6 to PRB9 in an UpPTS of a TDD special sub-frame 1, and a narrowband for transmitting a downlink channel in a DwPTS of the special sub-frame 1 is a narrowband 0 (PRB2 to PRB7). In this instance, if there is a downlink channel transmitted in the DwPTS, then no SRS will be transmitted in the UpPTS of the special sub-frame 1. Optionally in the instance above, if there is no downlink channel transmitted in the DwPTS, then there still may be an occasion to transmit an SRS in a part of the PRBs of the TDD special sub-frame 1, and optionally it may be simply defined that an SRS can be transmitted in the PRB6 and the PRB7, or the PRB8 and the PRB9 at that time, or a decision about whether to transmit an SRS can be further made in combination with another scheme (e.g., the scheme 2).

In a scheme 4-5, in a special sub-frame of a TDD system, if transmission frequency resources of an SRS in an UpPTS partially overlap with a narrowband for transmitting downlink data in a DwPTS, then it will be decided not to transmit an SRS over frequency resources, which do not overlap with the narrowband for transmitting downlink data in the DwPTS, among the transmission frequency resources of an SRS.

For example, an SRS is transmitted in corresponding PRB6 to PRB9 in an UpPTS of a TDD special sub-frame 1, and a narrowband for transmitting a downlink channel in a DwPTS of the special sub-frame 1 is a narrowband 0 (PRB2 to PRB7); and since the PRBs in which an SRS is transmitted in the special sub-frame 1 partially overlap with the narrowband for transmitting a downlink channel in the special sub-frame 1, no SRS is transmitted in the PRB8 and the PRB9 in the UpPTS of the special sub-frame 1. Optionally there still may be an occasion to transmit an SRS in the PRB6 and the PRB7, and optionally it may be simply defined that an SRS can be transmitted in the PRB6 and the PRB7, or a decision about whether to transmit an SRS can be further made in combination with another scheme (e.g., the scheme 2), that is, a decision about whether to transmit an SRS can be made as in the scheme above no matter there is really a downlink channel transmitted in the DwPTS of the special sub-frame 1.

In a scheme 4-6, in a special sub-frame of a TDD system, if transmission frequency resources of an SRS in an UpPTS partially overlap with a narrowband for transmitting downlink data in a DwPTS, and there are downlink data transmitted in the DwPTS, then it will be decided not to transmit an SRS over frequency resources, which do not overlap with the narrowband for transmitting downlink data in the DwPTS, among the transmission frequency resources of an SRS.

For example, an SRS is transmitted in corresponding PRB6 to PRB9 in an UpPTS of a TDD special sub-frame 1, and a narrowband for transmitting a downlink channel in a DwPTS of the special sub-frame 1 is a narrowband 0 (PRB2 to PRB7). In this instance, if there is a downlink channel transmitted in the DwPTS, then no SRS will be transmitted in the PRB8 and the PRB9 in the UpPTS of the special sub-frame 1. Optionally there still may be an occasion to transmit an SRS in the PRB6 and the PRB7, and particularly it may be simply defined that an SRS can be transmitted in the PRB6 and the PRB7, or a decision about whether to transmit an SRS can be further made in combination with another scheme (e.g., the scheme 2). Optionally in the instance above, if there is no downlink channel transmitted in the DwPTS, then there still may be an occasion to transmit an SRS in the PRB6 and the PRB7, or the PRB8 and the PRB9, in the TDD special sub-frame 1, and particularly it may be simply defined that an SRS can be transmitted in the PRB6 and the PRB7, or the PRB8 and the PRB9 at that time, or a decision about whether to transmit an SRS can be further made in combination with another scheme (e.g., the scheme 2).

Scheme 5.

In the scheme 5, the terminal can make a decision about whether to transmit an SRS (e.g., to drop an SRS) in a special sub-frame of a TDD system, according to whether a narrowband for transmitting downlink data in the special sub-frame is the same as a narrowband for transmitting uplink data in an adjacent uplink sub-frame subsequent to the special sub-frame, where the "narrowband for transmitting downlink data" can be expressed as a "narrowband for transmitting a downlink channel", and the downlink channel can include a PDSCH, an M-PDCCH, etc.; and the "narrowband for transmitting uplink data" can be expressed as a "narrowband for transmitting an uplink channel", and the uplink channel can include a PUCCH, a PUSCH, etc.

Optionally the scheme 5 can be further categorized into the following several implementations.

In a scheme 5-1, if a narrowband for transmitting downlink data in a DwPTS of a special sub-frame of a TDD system is different from a narrowband for transmitting uplink data in an adjacent uplink sub-frame subsequent to the special sub-frame, then it will be decided not to transmit an SRS in an UpPTS of the special sub-frame.

For example, an SRS is transmitted in corresponding PRB8 to PRB11 in an UpPTS of a TDD special sub-frame 1, a narrowband for transmitting a downlink channel in a DwPTS of the special sub-frame 1 is a narrowband 0 (PRB2 to PRB7), and a narrowband for transmitting an uplink channel in an adjacent uplink sub-frame 2 subsequent to the special sub-frame 1 is a narrowband 1 (PRB8 to PRB13). In this instance, since the narrowband for transmitting a downlink channel in the DwPTS of the special sub-frame 1 does not overlap with the narrowband for transmitting an uplink channel in the uplink sub-frame 2, no SRS is transmitted in the UpPTS of the special sub-frame 1, that is, a decision about whether to transmit an SRS is made as in the scheme above no matter there is really a channel transmitted in the DwPTS of the special sub-frame 1, and in the uplink sub-frame 2. Optionally if the narrowband for transmitting a downlink channel in the DwPTS of the special sub-frame of the TDD system is the same as the narrowband for transmitting uplink data in the adjacent uplink sub-frame subsequent to the special sub-frame, then there still may be an occasion to transmit an SRS in the UpPTS of the special sub-frame, and optionally a decision about whether to transmit an SRS will be further made in combination with another scheme (e.g., the scheme 2 or 4) according to a relationship between the transmission frequency resources of an SRS, and the narrowband.

In a scheme 5-2, if a narrowband for transmitting downlink data in a DwPTS of a special sub-frame of a TDD system is different from a narrowband for transmitting uplink data in an adjacent uplink sub-frame subsequent to the special sub-frame, and there are data transmitted in both the DwPTS of the special sub-frame, and the adjacent uplink sub-frame subsequent to the special sub-frame, then it will be decided not to transmit an SRS in an UpPTS of the special sub-frame.

For example, an SRS is transmitted in corresponding PRB8 to PRB11 in an UpPTS of a TDD special sub-frame 1, a narrowband for transmitting a downlink channel in a DwPTS of the special sub-frame 1 is a narrowband 0 (PRB2 to PRB7), and a narrowband for transmitting an uplink channel in an adjacent uplink sub-frame 2 subsequent to the special sub-frame 1 is a narrowband 1 (PRB8 to PRB13). In this instance, if there are data transmitted in both the DwPTS of the special sub-frame, and the uplink sub-frame 2, then no SRS will be transmitted in the UpPTS of the special sub-frame 1. Optionally in the instance above, if there are no data transmitted in the DwPTS of the special sub-frame, or in the uplink sub-frame 2, then there still may be an occasion to transmit an SRS in the UpPTS of the special sub-frame, and optionally a decision about whether to transmit an SRS will be further made in combination with another scheme (e.g., the schemes 2, 4) according to a relationship between the transmission frequency resources of an SRS, and the narrowband.

Optionally the scheme 4 and the scheme 5 above can be applicable to a configuration scenario where there is no retuning period of time in a number of OFDM symbols configured for a Guard Period (GP), i.e., a configuration scenario where the length of time for the GP only supports a period of time for switching from the downlink to the uplink, and a timing advance for an uplink transmission instance of time, but does not account for a retuning period of time.

Optionally the scheme 1, the scheme 2, and the scheme 3 above can be applicable to a Frequency Division Duplex (FDD) system and a TDD system.

The respective schemes above can be applicable separately or in combination. For example, when a negative determination is made (for example, the transmission frequency resources overlap with the narrowband, or the narrowbands are the same) in some embodiment above, a decision about whether to transmit an SRS can be further made in combination with another embodiment, i.e., in a combination of the different schemes.

In an example where the scheme 1 above is applied in combination with the scheme 2 above, an SRS is transmitted in corresponding PRB8 to PRB11 in an uplink sub-frame 2, a narrowband for transmitting an uplink channel in the uplink sub-frame 2 is a narrowband 1 (PRB8 to PRB13), and a narrowband for transmitting an uplink channel in an uplink sub-frame 3 is a narrowband 0 (PRB2 to PRB7). In this instance, the PRBs in which an SRS is transmitted in the uplink sub-frame 2 lie in the narrowband for transmitting an uplink channel in the uplink sub-frame 2, but does no overlap with the narrowband for transmitting an uplink channel in the uplink sub-frame 3, so in an example, a decision is made not to transmit an SRS in the uplink sub-frame 2, that is, no SRS is transmitted no matter whether there is really an uplink channel transmitted in the uplink sub-frame 2 and the uplink sub-frame 3; and in another example, if there is an uplink channel transmitted in the uplink sub-frame 3 (such a sub-frame that the corresponding narrowband thereof for transmitting data does not overlap with the PRBs of an SRS) indeed, then no SRS will be transmitted in the uplink sub-frame 2; otherwise, an SRS still can be transmitted.

In another example where more than one of the schemes are combined, when the narrowbands for transmitting an uplink channel in the adjacent uplink sub-frames are the same in the scheme 3 (e.g., the scheme 3-1 or the scheme 3-2), a decision whether to transmit an SRS can be further made in combination with the scheme 1 or the scheme 2.

In another example where more than one of the schemes are combined, when the narrowbands for transmitting data, corresponding respectively to the DwPTS and the UpPTS are the same, a decision whether to transmit an SRS can be further made in combination with the scheme 2.

In another example where more than one of the schemes are combined, when the narrowband for transmitting a downlink channel in the special sub-frame is the same as the narrowband for transmitting an uplink channel in the adjacent uplink sub-frame in the scheme 5, a decision whether to transmit an SRS can be further made in combination with the scheme 2, although a repeated description thereof will be omitted here.

Furthermore a number of sub-schemes in a scheme can also be applicable in combination, and for example, the scheme 1-1 and the scheme 1-3 in the scheme 1 can be applicable in combination, the scheme 1-1 and the scheme 1-4 can be applicable in combination, the scheme 1-2 and the scheme 1-5 can be applicable in combination, and the scheme 1-2 and the scheme 1-6 can be applicable in combination, respectively for instances in which the transmission frequency resources do not overlap with the narrowband, and in which the transmission frequency resources partially overlap with the narrowband; and alike, the sub-schemes in the other schemes can also be applicable in combination.

As can be apparent from the description above, the embodiments of the invention propose a new SRS transmission rule, particularly applicable to SRS transmission by a narrowband terminal.

Based upon the same technical idea, an embodiment of the invention further provides an apparatus for transmitting an SRS.

Figure 2:
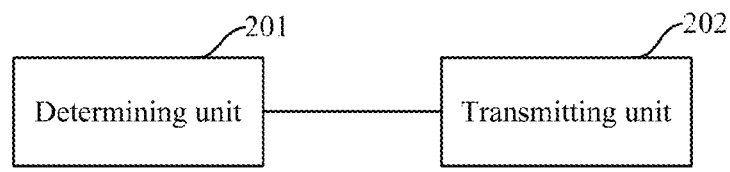
FIG. 2 is a schematic structural diagram of a terminal according to an embodiment of the invention.

Referring to FIG. 2 illustrating an apparatus for transmitting an SRS according to an embodiment of the invention, the apparatus can be a terminal, or can be a hardware and/or software component integrated in a terminal. The apparatus can include a determining unit 201, and can further include a transmitting unit 202.

The determining unit 201 is configured to decide whether to transmit an SRS, according to whether transmission frequency resources of an SRS overlap with a narrowband for transmitting data, or whether adjacent narrowbands for transmitting data are the same.

Here the following several possible decisions can be made about whether to transmit an SRS.

A decision is made not to transmit an SRS (i.e., to drop an SRS).

A decision is made to transmit an SRS.

A decision is made to transmit an SRS over a part of the transmission frequency resources of an SRS, and not to transmit an SRS over the remaining transmission frequency resources (i.e., to drop an SRS over a part thereof).

The transmitting unit 202 can be configured to transmit an SRS according to the decision of the determining unit 201, and for example, the transmitting unit 202 may operate as follows: if a decision is made to transmit an SRS, then it will transmit an SRS over the transmission frequency resources of an SRS; otherwise, it will drop an SRS. Alternatively it can transmit an SRS over a part of the transmission frequency resources of an SRS, and drop an SRS over the remaining transmission frequency resources.

Optionally the determining unit 201 can be configured to perform following operations.

In an SRS sub-frame, if transmission frequency resources of an SRS do not overlap with a narrowband for transmitting uplink data, the determining unit 201 can be configured to decide not to transmit an SRS in the SRS sub-frame; or in an SRS sub-frame, if transmission frequency resources of an SRS do not overlap with a narrowband for transmitting uplink data, and there are uplink data transmitted in the SRS sub-frame, the determining unit 201 can be configured to decide not to transmit an SRS in the SRS sub-frame; or in an SRS sub-frame, if transmission frequency resources of an SRS partially overlap with a narrowband for transmitting uplink data, the determining unit 201 can be configured to decide not to transmit an SRS in the SRS sub-frame; or in an SRS sub-frame, if transmission frequency resources of an SRS partially overlap with a narrowband for transmitting uplink data, the determining unit 201 can be configured to decide not to transmit an SRS over frequency resources, which do not overlap with the narrowband for transmitting uplink data, among the transmission frequency resources of an SRS; or in an SRS sub-frame, if transmission frequency resources of an SRS partially overlap with a narrowband for transmitting an uplink channel, and there are uplink data transmitted in the SRS sub-frame, the determining unit 201 can be configured to decide not to transmit an SRS in the SRS sub-frame; or in an SRS sub-frame, if transmission frequency resources of an SRS partially overlap with a narrowband for transmitting an uplink channel, and there are uplink data transmitted in the SRS sub-frame, the determining unit 201 can be configured to decide not to transmit an SRS over frequency resources, which do not overlap with the narrowband for transmitting uplink data, among the transmission frequency resources of an SRS.

Here the SRS sub-frame is a sub-frame specific to a narrowband terminal, and the SRS sub-frame includes an UpPTS or a normal uplink sub-frame.

Optionally the determining unit 201 can be configured to perform following operations.

In an SRS sub-frame, if transmission frequency resources of an SRS do not overlap with a narrowband for transmitting uplink data in an adjacent uplink sub-frame subsequent to the SRS sub-frame, the determining unit 201 can be configured to decide not to transmit an SRS in the SRS sub-frame; or in an SRS sub-frame, if transmission frequency resources of an SRS do not overlap with a narrowband for transmitting uplink data in an adjacent uplink sub-frame subsequent to the SRS sub-frame, and there are uplink data transmitted in the adjacent uplink sub-frame subsequent to the SRS sub-frame, the determining unit 201 can be configured to decide not to transmit an SRS in the SRS sub-frame; or in an SRS sub-frame, if transmission frequency resources of an SRS partially overlap with a narrowband for transmitting uplink data in an adjacent uplink sub-frame subsequent to the SRS sub-frame, the determining unit 201 can be configured to decide not to transmit an SRS in the SRS sub-frame; or in an SRS sub-frame, if transmission frequency resources of an SRS partially overlap with a narrowband for transmitting uplink data in an adjacent uplink sub-frame subsequent to the SRS sub-frame, the determining unit 201 can be configured to decide not to transmit an SRS over frequency resources, which do not overlap with the narrowband for transmitting uplink data, among the transmission frequency resources of an SRS; or in an SRS sub-frame, if transmission frequency resources of an SRS partially overlap with a narrowband for transmitting an uplink channel in an adjacent sub-frame subsequent to the SRS sub-frame, and there are uplink data transmitted in the adjacent uplink sub-frame subsequent to the SRS sub-frame, the determining unit 201 can be configured to decide not to transmit an SRS in the SRS sub-frame; or in an SRS sub-frame, if transmission frequency resources of an SRS partially overlap with a narrowband for transmitting an uplink channel in an adjacent uplink sub-frame subsequent to the SRS sub-frame, and there are uplink data transmitted in the adjacent uplink sub-frame subsequent to the SRS sub-frame, the determining unit 201 can be configured to decide not to transmit an SRS over frequency resources, which do not overlap with the narrowband for transmitting uplink data, among the transmission frequency resources of an SRS.

Optionally the determining unit 201 can be configured to perform following operations.

If an uplink channel transmitted in the adjacent uplink sub-frame subsequent to the SRS sub-frame is a Physical Random Access Channel (PRACH), then: in the SRS sub-frame, if the transmission frequency resources of an SRS do not overlap with the narrowband for transmitting a PRACH in the adjacent uplink sub-frame subsequent to the SRS sub-frame, and a Timing Advance (TA) value corresponding to the SRS sub-frame is less than a retuning period of time, the determining unit 201 can be configured to decide not to transmit an SRS in the SRS sub-frame; or in the SRS sub-frame, if the transmission frequency resources of an SRS partially overlap with the narrowband for transmitting a PRACH in the adjacent uplink sub-frame subsequent to the SRS sub-frame, and a TA value corresponding to the SRS sub-frame is less than a retuning period of time, the determining unit 201 can be configured to decide not to transmit an SRS in the SRS sub-frame; or in the SRS sub-frame, if the transmission frequency resources of an SRS partially overlap with the narrowband for transmitting a PRACH in the adjacent uplink sub-frame subsequent to the SRS sub-frame, and a TA value corresponding to the SRS sub-frame is less than a retuning period of time, the determining unit 201 can be configured to decide not to transmit an SRS over frequency resources, which do not overlap with the narrowband for transmitting uplink data, among the transmission frequency resources of an SRS.

Optionally the determining unit 201 can be configured to perform following operations.

If a narrowband for transmitting uplink data in the SRS sub-frame is different from a narrowband for transmitting uplink data in an adjacent uplink sub-frame subsequent to the SRS sub-frame, the determining unit 201 can be configured to decide not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in both the narrowband for transmitting uplink data in the SRS sub-frame, and the narrowband for transmitting uplink data in the adjacent uplink sub-frame subsequent to the SRS sub-frame, the determining unit 201 can be configured to decide not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which does not overlap with transmission frequency resources of an SRS, among the narrowband for transmitting uplink data in the SRS sub-frame, and the narrowband for transmitting uplink data in the adjacent uplink sub-frame subsequent to the SRS sub-frame, the determining unit 201 can be configured to decide not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which partially overlaps with transmission frequency resources of an SRS, among the narrowband for transmitting uplink data in the SRS sub-frame, and the narrowband for transmitting uplink data in the adjacent uplink sub-frame subsequent to the SRS sub-frame, the determining unit 201 can be configured to decide not to transmit an SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which partially overlaps with transmission frequency resources of an SRS, among the narrowband for transmitting uplink data in the SRS sub-frame, and the narrowband for transmitting uplink data in the adjacent uplink sub-frame subsequent to the SRS sub-frame, the determining unit 201 can be configured to decide not to transmit an SRS over frequency resources, which do not overlap with the narrowband in which there are uplink data transmitted, among the transmission frequency resources of an SRS.

Optionally the determining unit 201 can be configured to perform following operations.

In a special sub-frame of a TDD system, if transmission frequency resources of an SRS in an UpPTS do not overlap with a narrowband for transmitting downlink data in a DwPTS, the determining unit 201 can be configured to decide not to transmit an SRS in the UpPTS of the special sub-frame; or in a special sub-frame of a TDD system, if transmission frequency resources of an SRS in an UpPTS do not overlap with a narrowband for transmitting downlink data in a DwPTS, and there are downlink data transmitted in the DwPTS, the determining unit 201 can be configured to decide not to transmit an SRS in the UpPTS of the special sub-frame; or in a special sub-frame of a TDD system, if transmission frequency resources of an SRS in an UpPTS partially overlap with a narrowband for transmitting downlink data in a DwPTS, the determining unit 201 can be configured to decide not to transmit an SRS in the UpPTS of the special sub-frame; or in a special sub-frame of a TDD system, if transmission frequency resources of an SRS in an UpPTS partially overlap with a narrowband for transmitting downlink data in a DwPTS, and there are downlink data transmitted in the DwPTS, the determining unit 201 can be configured to decide not to transmit an SRS in the UpPTS of the special sub-frame: or in a special sub-frame of a TDD system, if transmission frequency resources of an SRS in an UpPTS partially overlap with a narrowband for transmitting downlink data in a DwPTS, the determining unit 201 can be configured to decide not to transmit an SRS over frequency resources, which do not overlap with the narrowband for transmitting downlink data in the DwPTS, among the transmission frequency resources of an SRS; or in a special sub-frame of a TDD system, if transmission frequency resources of an SRS in an UpPTS partially overlap with a narrowband for transmitting downlink data in a DwPTS, and there are downlink data transmitted in the DwPTS, the determining unit 201 can be configured to decide not to transmit an SRS over frequency resources, which do not overlap with the narrowband for transmitting downlink data in the DwPTS, among the transmission frequency resources of an SRS.

Optionally the determining unit 201 can be configured to perform following operations.

If a narrowband for transmitting downlink data in a DwPTS of a special sub-frame of a TDD system is different from a narrowband for transmitting uplink data in an adjacent uplink sub-frame subsequent to the special sub-frame, the determining unit 201 can be configured to decide not to transmit an SRS in an UpPTS of the special sub-frame; or if a narrowband for transmitting downlink data in a DwPTS of a special sub-frame of a TDD system is different from a narrowband for transmitting uplink data in an adjacent uplink sub-frame subsequent to the special sub-frame, and there are data transmitted in both the DwPTS of the special sub-frame and the adjacent uplink sub-frame subsequent to the special sub-frame, the determining unit 201 can be configured to decide not to transmit an SRS in an UpPTS of the special sub-frame.

Based upon the same technical idea, an embodiment of the invention further provides a terminal.

Figure 3:
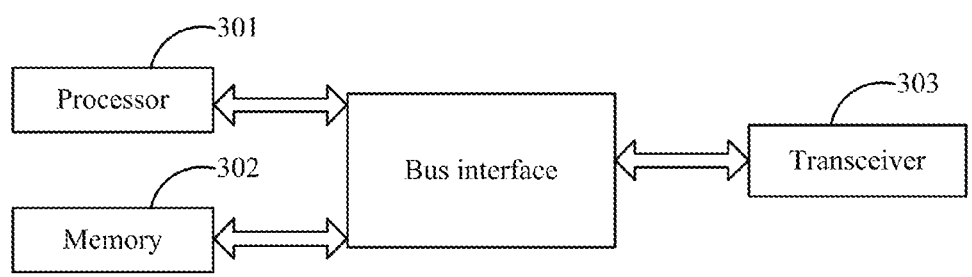
FIG. 3 is a schematic structural diagram of a terminal according to another embodiment of the invention.

Referring to FIG. 3 illustrates a terminal according to an embodiment of the invention. The terminal can include a processor 301, a memory 302, a transceiver 303, and a bus interface.

The processor 301 is responsible for managing a bus architecture and performing normal processes, and the memory 302 can store data for use by the processor 301 in performing operations. The transceiver 303 is configured to be controlled by the processor 301 to transmit and receive data.

The bus architecture can include any number of interconnecting buses and bridges to particularly link together various circuits including one or more processors represented by the processor 301, and one or more memories represented by the memory 302. The bus architecture can further link together various other circuits, e.g., prophetical devices, manostats, power management circuits, etc., all of which are well known in the art, so a further description thereof will be omitted in this context. The bus interface serves as an interface. The transceiver 303 can be a number of elements including a transmitter and a receiver which are units for communication with various other devices over a transmission medium. The processor 301 is responsible for managing the bus architecture and performing normal processes, and the memory 302 can store data for use by the processor 301 in performing operations.

The SRS transmission flow according to the embodiments of the invention can be applicable to the processor 301, or performed by the processor 301. In an implementation, the respective steps in the SRS transmission flow can be performed by an integrated logic circuit in hardware, or instructions in software, in the processor 301. The processor 301 can be a general-purpose processor, a digital signal processor, a dedicated integrated circuit, a field programmable gate array, or other programmable logic devices, discrete gates, or transistor logic devices, discrete hardware components to embody or perform the respective methods, steps, and logic block diagrams according to the embodiments of the invention. The general-purpose processor can be a microprocessor, any conventional processor, etc. The steps in the method according to the embodiment of the invention can be performed directly by a processor in hardware, or modules in hardware and software in the processor in combination.

The software modules can reside in a random memory, a flash memory, a read-only memory, a programmable read-only memory, or an electrically erasable, writable and programmable memory, a register, or any other storage medium well known in the art. The storage medium resides in the memory 302, and the processor 301 reads the information in the memory 302, and performs the steps in the SRS transmission flow according to the embodiments above in combination with the hardware thereof.

Optionally the processor 301 is configured to read the program in the memory 302, and to perform the SRS transmission flow according to the embodiments above.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting a Sounding Reference Signal (SRS), the method comprises:
deciding whether to transmit an SRS, according to whether transmission frequency resources of an SRS overlap with a narrowband for transmitting data, or according to whether a narrowband for transmitting uplink data in an SRS sub-frame is same with a narrowband for transmitting uplink data in an adjacent uplink sub-frame subsequent to the SRS sub-frame, or whether a narrowband for transmitting downlink data in a Downlink Pilot Time Slot, DwPTS of a special sub-frame of a Time Division Duplex, TDD system is same with a narrowband for transmitting uplink data in an adjacent uplink sub-frame subsequent to the special sub-frame;

wherein the narrowband comprises Physical Resource Blocks (PRBs);

wherein deciding whether to transmit an SRS, according to whether transmission frequency resources of an SRS overlap with a narrowband for transmitting data comprises:

in an SRS sub-frame, if transmission frequency resources of the SRS do not overlap with a narrowband for transmitting uplink data, and there are uplink data transmitted in the SRS sub-frame, then deciding not to transmit the SRS in the SRS sub-frame; or in an SRS sub-frame, if transmission frequency resources of the SRS partially overlap with a narrowband for transmitting uplink data, then deciding not to transmit the SRS in the SRS sub-frame; or in an SRS sub-frame, if transmission frequency resources of the SRS partially overlap with a narrowband for transmitting uplink data, then deciding not to transmit the SRS over frequency resources, which do not overlap with the narrowband for transmitting uplink data, among the transmission frequency resources of the SRS; or in an SRS sub-frame, if transmission frequency resources of the SRS partially overlap with a narrowband for transmitting an uplink channel, and there are uplink data transmitted in the SRS sub-frame, then deciding not to transmit the SRS in the SRS sub-frame; or in an SRS sub-frame, if transmission frequency resources of the SRS partially overlap with a narrowband for transmitting an uplink channel, and there are uplink data transmitted in the SRS sub-frame, then deciding not to transmit the SRS over frequency resources, which do not overlap with the narrowband for transmitting uplink data, among the transmission frequency resources of the SRS; or in an SRS sub-frame, if transmission frequency resources of the SRS do not overlap with a narrowband for transmitting uplink data in an adjacent uplink sub-frame subsequent to the SRS sub-frame, and there are uplink data transmitted in the adjacent uplink sub-frame subsequent to the SRS sub-frame, then deciding not to transmit the SRS in the SRS sub-frame; or in an SRS sub-frame, if transmission frequency resources of the SRS partially overlap with a narrowband for transmitting uplink data in an adjacent uplink sub-frame subsequent to the SRS sub-frame, then deciding not to transmit the SRS in the SRS sub-frame; or in an SRS sub-frame, if transmission frequency resources of the SRS partially overlap with a narrowband for transmitting uplink data in an adjacent uplink sub-frame subsequent to the SRS sub-frame, then deciding not to transmit the SRS over frequency resources, which do not overlap with the narrowband for transmitting uplink data, among the transmission frequency resources of the SRS; or in an SRS sub-frame, if transmission frequency resources of the SRS partially overlap with a narrowband for transmitting an uplink channel in an adjacent uplink sub-frame subsequent to the SRS sub-frame, and there are uplink data transmitted in the adjacent uplink sub-frame subsequent to the SRS sub-frame, then deciding not to transmit the SRS in the SRS sub-frame; or in an SRS sub-frame, if transmission frequency resources of the SRS partially overlap with a narrowband for transmitting an uplink channel in an adjacent uplink sub-frame subsequent to the SRS sub-frame, and there are uplink data transmitted in the adjacent uplink sub-frame subsequent to the SRS sub-frame, then deciding not to transmit the SRS over frequency resources, which do not overlap with the narrowband for transmitting uplink data, among the transmission frequency resources of the SRS; or in a special sub-frame of a TDD system, if transmission frequency resources of the SRS in an Uplink Pilot Time Slot (UpPTS) do not overlap with a narrowband for transmitting downlink data in a DwPTS, then deciding not to transmit the SRS in the UpPTS of the special sub-frame; or in a special sub-frame of a TDD system, if transmission frequency resources of the SRS in an UpPTS do not overlap with a narrowband for transmitting downlink data in a DwPTS, and there are downlink data transmitted in the DwPTS, then deciding not to transmit the SRS in the UpPTS of the special sub-frame; or in a special sub-frame of a TDD system, if transmission frequency resources of the SRS in an UpPTS partially overlaps with a narrowband for transmitting downlink data in a DwPTS, then deciding not to transmit the SRS in the UpPTS of the special sub-frame; or in a special sub-frame of a TDD system, if transmission frequency resources of the SRS in an UpPTS partially overlap with a narrowband for transmitting downlink data in a DwPTS, and there are downlink data transmitted in the DwPTS, then deciding not to transmit the SRS in the UpPTS of the special sub-frame; or in a special sub-frame of a TDD system, if transmission frequency resources of the SRS in an UpPTS partially overlap with a narrowband for transmitting downlink data in a DwPTS, then deciding not to transmit the SRS over frequency resources, which do not overlap with the narrowband for transmitting downlink data in the DwPTS, among the transmission frequency resources of the SRS; or in a special sub-frame of a TDD system, if transmission frequency resources of the SRS in an UpPTS partially overlap with a narrowband for transmitting downlink data in a DwPTS, and there are downlink data transmitted in the DwPTS, then deciding not to transmit the SRS over frequency resources, which do not overlap with the narrowband for transmitting downlink data in the DwPTS, among the transmission frequency resources of the SRS;

wherein deciding whether to transmit an SRS, according to whether a narrowband for transmitting uplink data in an SRS sub-frame is same with a narrowband for transmitting uplink data in an adjacent uplink sub-frame subsequent to the SRS sub-frame comprises:

if a narrowband for transmitting uplink data in an SRS sub-frame is different from a narrowband for transmitting uplink data in an adjacent uplink sub-frame subsequent to the SRS sub-frame, and there are uplink data transmitted in both of the narrowband for transmitting uplink data in the SRS sub-frame and the narrowband for transmitting uplink data in the adjacent uplink sub-frame subsequent to the SRS sub-frame, then deciding not to transmit the SRS in the SRS sub-frame; or if a narrowband for transmitting uplink data in an SRS sub-frame is different from a narrowband for transmitting uplink data in an adjacent uplink sub-frame subsequent to the SRS sub-frame, and there are uplink data transmitted in a narrowband, which does not overlap with transmission frequency resources of the SRS, among the narrowband for transmitting uplink data in the SRS sub-frame, and the narrowband for transmitting uplink data in the adjacent uplink sub-frame subsequent to the SRS sub-frame, then deciding not to transmit the SRS in the SRS sub-frame; or if a narrowband for transmitting uplink data in an SRS sub-frame is different from a narrowband for transmitting uplink data in an adjacent uplink sub-frame subsequent to the SRS sub-frame, and there are uplink data transmitted in a narrowband, which partially overlaps with transmission frequency resources of the SRS, among the narrowband for transmitting uplink data in the SRS sub-frame, and the narrowband for transmitting uplink data in the adjacent uplink sub-frame subsequent to the SRS sub-frame, then deciding not to transmit the SRS in the SRS sub-frame; or if a narrowband for transmitting uplink data in an SRS sub-frame is different from a narrowband for transmitting uplink data in an adjacent uplink sub-frame subsequent to the SRS sub-frame, and there are uplink data transmitted in a narrowband, which partially overlaps with transmission frequency resources of the SRS, among the narrowband for transmitting uplink data in the SRS sub-frame, and the narrowband for transmitting uplink data in the adjacent uplink sub-frame subsequent to the SRS sub-frame, then deciding not to transmit the SRS over frequency resources, which do not overlap with the narrowband in which there are uplink data transmitted, among the transmission frequency resources of the SRS;

wherein deciding whether to transmit an SRS, according to whether a narrowband for transmitting downlink data in a DwPTS of a special sub-frame of a TDD system is same with a narrowband for transmitting uplink data in an adjacent uplink sub-frame subsequent to the special sub-frame comprises:

if a narrowband for transmitting downlink data in a DwPTS of a special sub-frame of a TDD system is different from a narrowband for transmitting uplink data in an adjacent uplink sub-frame subsequent to the special sub-frame, and there are data transmitted in both of the DwPTS of the special sub-frame and the adjacent uplink sub-frame subsequent to the special sub-frame, then deciding not to transmit the SRS in an Uplink Pilot Time Slot, UpPTS of the special sub-frame.

2. The method according to claim 1, wherein if an uplink channel transmitted in the adjacent uplink sub-frame subsequent to the SRS sub-frame is a Physical Random Access Channel (PRACH), then deciding whether to transmit an SRS, according to whether transmission frequency resources of an SRS overlap with a narrowband for transmitting data comprises:

in the SRS sub-frame, if the transmission frequency resources of the SRS do not overlap with a narrowband for transmitting a PRACH in the adjacent uplink sub-frame subsequent to the SRS sub-frame, and a Timing Advance (TA) value corresponding to the SRS sub-frame is less than a retuning period of time, then deciding not to transmit the SRS in the SRS sub-frame; or in the SRS sub-frame, if the transmission frequency resources of the SRS partially overlap with a narrowband for transmitting a PRACH in the adjacent uplink sub-frame subsequent to the SRS sub-frame, and a TA value corresponding to the SRS sub-frame is less than a retuning period of time, then deciding not to transmit the SRS in the SRS sub-frame; or in the SRS sub-frame, if the transmission frequency resources of the SRS partially overlap with a narrowband for transmitting a PRACH in the adjacent uplink sub-frame subsequent to the SRS sub-frame, and a TA value corresponding to the SRS sub-frame is less than a retuning period of time, then deciding not to transmit the SRS over frequency resources, which do not overlap with the narrowband for transmitting uplink data, among the transmission frequency resources of the SRS.

3. The method according to claim 1, wherein the uplink data comprise data transmitted in one or more of following uplink channels: a Physical Uplink Control Channel (PUCCH), a Physical Uplink Shared Channel (PUSCH), and a Physical Random Access Channel (PRACH).

4. The method according to claim 1, wherein the downlink data comprise data transmitted in one or more of following downlink channels: a Physical Downlink Shared Channel (PDSCH), a Machine Type Communication (MTC) Physical Downlink Control Channel (M-PDCCH), a Physical Broadcast Channel (PBCH), and a Physical Multicast Channel (PMCH).

5. The method according to claim 1, wherein the SRS sub-frame is a sub-frame specific to a narrowband terminal, and the SRS sub-frame comprises an Uplink Pilot Time Slot, UpPTS or a normal uplink sub-frame.

6. An apparatus for transmitting a Sounding Reference Signal (SRS), the apparatus comprises a processor, a memory, and a transceiver, wherein:

the processor is configured to read and execute a program in the memory:

to transmit an SRS, according to whether transmission frequency resources of the SRS overlap with a narrowband for transmitting data, or according to whether a narrowband for transmitting uplink data in an SRS sub-frame is same with a narrowband for transmitting uplink data in an adjacent uplink sub-frame subsequent to the SRS sub-frame, or whether a narrowband for transmitting downlink data in a Downlink Pilot Time Slot, DwPTS of a special sub-frame of a Time Division Duplex, TDD system is same with a narrowband for transmitting uplink data in an adjacent uplink sub-frame subsequent to the special sub-frame; wherein the narrowband comprises Physical Resource Blocks (PRBs); and the transceiver is configured to be controlled by the processor to transmit and receive data;

wherein the processor is configured:

in an SRS sub-frame, if transmission frequency resources of the SRS do not overlap with a narrowband for transmitting uplink data, and there are uplink data transmitted in the SRS sub-frame, to decide not to transmit the SRS in the SRS sub-frame; or in an SRS sub-frame, if transmission frequency resources of the SRS partially overlap with a narrowband for transmitting uplink data, to decide not to transmit the SRS in the SRS sub-frame; or in an SRS sub-frame, if transmission frequency resources of the SRS partially overlap with a narrowband for transmitting uplink data, to decide not to transmit the SRS over frequency resources, which do not overlap with the narrowband for transmitting uplink data, among the transmission frequency resources of the SRS; or in an SRS sub-frame, if transmission frequency resources of the SRS partially overlap with a narrowband for transmitting an uplink channel, and there are uplink data transmitted in the SRS sub-frame, to decide not to transmit the SRS in the SRS sub-frame; or in an SRS sub-frame, if transmission frequency resources of the SRS partially overlap with a narrowband for transmitting an uplink channel, and there are uplink data transmitted in the SRS sub-frame, to decide not to transmit the SRS over frequency resources, which do not overlap with the narrowband for transmitting uplink data, among the transmission frequency resources of the SRS; or in an SRS sub-frame, if transmission frequency resources of the SRS do not overlap with a narrowband for transmitting uplink data in an adjacent uplink sub-frame subsequent to the SRS sub-frame, and there are uplink data transmitted in the adjacent uplink sub-frame subsequent to the SRS sub-frame, to decide not to transmit the SRS in the SRS sub-frame; or in an SRS sub-frame, if transmission frequency resources of the SRS partially overlap with a narrowband for transmitting uplink data in an adjacent uplink sub-frame subsequent to the SRS sub-frame, to decide not to transmit the SRS in the SRS sub-frame; or in an SRS sub-frame, if transmission frequency resources of the SRS partially overlap with a narrowband for transmitting uplink data in an adjacent uplink sub-frame subsequent to the SRS sub-frame, to decide not to transmit the SRS over frequency resources, which do not overlap with the narrowband for transmitting uplink data, among the transmission frequency resources of the SRS; or in an SRS sub-frame, if transmission frequency resources of the SRS partially overlap with a narrowband for transmitting an uplink channel in an adjacent uplink sub-frame subsequent to the SRS sub-frame, and there are uplink data transmitted in the adjacent uplink sub-frame subsequent to the SRS sub-frame, to decide not to transmit the SRS in the SRS sub-frame; or in an SRS sub-frame, if transmission frequency resources of the SRS partially overlap with a narrowband for transmitting an uplink channel in an adjacent uplink sub-frame subsequent to the SRS sub-frame, and there are uplink data transmitted in the adjacent uplink sub-frame subsequent to the SRS sub-frame, to decide not to transmit the SRS over frequency resources, which do not overlap with the narrowband for transmitting uplink data, among the transmission frequency resources of the SRS; or in a special sub-frame of a TDD system, if transmission frequency resources of the SRS in an Uplink Pilot Time Slot (UpPTS) do not overlap with a narrowband for transmitting downlink data in a DwPTS, to decide not to transmit the SRS in the UpPTS of the special sub-frame; or in a special sub-frame of a TDD system, if transmission frequency resources of the SRS in an UpPTS do not overlap with a narrowband for transmitting downlink data in a DwPTS, and there are downlink data transmitted in the DwPTS, to decide not to transmit the SRS in the UpPTS of the special sub-frame; or in a special sub-frame of a TDD system, if transmission frequency resources of the SRS in an UpPTS partially overlap with a narrowband for transmitting downlink data in a DwPTS, to decide not to transmit the SRS in the UpPTS of the special sub-frame; or in a special sub-frame of a TDD system, if transmission frequency resources of the SRS in an UpPTS partially overlap with a narrowband for transmitting downlink data in a DwPTS, and there are downlink data transmitted in the DwPTS, to decide not to transmit the SRS in the UpPTS of the special sub-frame; or in a special sub-frame of a TDD system, if transmission frequency resources of the SRS in an UpPTS partially overlap with a narrowband for transmitting downlink data in a DwPTS, to decide not to transmit the SRS over frequency resources, which do not overlap with the narrowband for transmitting downlink data in the DwPTS, among the transmission frequency resources of the SRS; or in a special sub-frame of a TDD system, if transmission frequency resources of the SRS in an UpPTS partially overlap with a narrowband for transmitting downlink data in a DwPTS, and there are downlink data transmitted in the DwPTS, to decide not to transmit the SRS over frequency resources, which do not overlap with the narrowband for transmitting downlink data in the DwPTS, among the transmission frequency resources of the SRS;

wherein the processor is configured:

if a narrowband for transmitting uplink data in the SRS sub-frame is different from a narrowband for transmitting uplink data in an adjacent uplink sub-frame subsequent to the SRS sub-frame, and there are uplink data transmitted in both of the narrowband for transmitting uplink data in the SRS sub-frame and the narrowband for transmitting uplink data in the adjacent uplink sub-frame subsequent to the SRS sub-frame, to decide not to transmit the SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which does not overlap with transmission frequency resources of the SRS, among the narrowband for transmitting uplink data in the SRS sub-frame and the narrowband for transmitting uplink data in the adjacent uplink sub-frame subsequent to the SRS sub-frame, to decide not to transmit the SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which partially overlaps with transmission frequency resources of the SRS, among the narrowband for transmitting uplink data in the SRS sub-frame and the narrowband for transmitting uplink data in the adjacent uplink sub-frame subsequent to the SRS sub-frame, to decide not to transmit the SRS in the SRS sub-frame; or if a narrowband for transmitting uplink data in the SRS sub-frame is different from a narrowband for transmitting uplink data in an adjacent uplink sub-frame subsequent to the SRS sub-frame, and there are uplink data transmitted in a narrowband, which partially overlaps with transmission frequency resources of the SRS, among the narrowband for transmitting uplink data in the SRS sub-frame and the narrowband for transmitting uplink data in the adjacent uplink sub-frame subsequent to the SRS sub-frame, to decide not to transmit the SRS over frequency resources, which do not overlap with the narrowband in which there are uplink data transmitted, among the transmission frequency resources of the SRS;

wherein the processor is configured:

if a narrowband for transmitting downlink data in a DwPTS of a special sub-frame of a TDD system is different from a narrowband for transmitting uplink data in an adjacent uplink sub-frame subsequent to the special sub-frame, and there are data transmitted in both of the DwPTS of the special sub-frame and the adjacent uplink sub-frame subsequent to the special sub-frame, to decide not to transmit the SRS in an Uplink Pilot Time Slot, UpPTS of the special sub-frame.

7. The apparatus according to claim 6, wherein the processor is configured:

if an uplink channel transmitted in the adjacent uplink sub-frame subsequent to the SRS sub-frame is a Physical Random Access Channel (PRACH), then:

in the SRS sub-frame, if the transmission frequency resources of the SRS do not overlap with the narrowband for transmitting a PRACH in the adjacent uplink sub-frame subsequent to the SRS sub-frame, and a Timing Advance (TA) value corresponding to the SRS sub-frame is less than a retuning period of time, to decide not to transmit the SRS in the SRS sub-frame; or in the SRS sub-frame, if the transmission frequency resources of the SRS partially overlap with the narrowband for transmitting a PRACH in the adjacent uplink sub-frame subsequent to the SRS sub-frame, and a TA value corresponding to the SRS sub-frame is less than a retuning period of time, to decide not to transmit the SRS in the SRS sub-frame; or in the SRS sub-frame, if the transmission frequency resources of the SRS partially overlap with the narrowband for transmitting a PRACH in the adjacent uplink sub-frame subsequent to the SRS sub-frame, and a TA value corresponding to the SRS sub-frame is less than a retuning period of time, to decide not to transmit the SRS over frequency resources, which do not overlap with the narrowband for transmitting uplink data, among the transmission frequency resources of the SRS.

8. The apparatus according to claim 6, wherein the uplink data comprise data transmitted in one or more of following uplink channels: a Physical Uplink Control Channel (PUCCH), a Physical Uplink Shared Channel (PUSCH), and a Physical Random Access Channel (PRACH).

9. The apparatus according to claim 6, wherein the downlink data comprise data transmitted in one or more of following downlink channels: a Physical Downlink Shared Channel (PDSCH), a Machine Type Communication (MTC) Physical Downlink Control Channel (M-PDCCH), a Physical Broadcast Channel (PBCH), and a Physical Multicast Channel (PMCH).

10. The apparatus according to claim 6, wherein the SRS sub-frame is a sub-frame specific to a narrowband terminal, and the SRS sub-frame comprises an Uplink Pilot Time Slot, UpPTS or a normal uplink sub-frame.

* * * * *